United States Patent
Yang

(10) Patent No.: US 7,618,340 B2
(45) Date of Patent: Nov. 17, 2009

(54) ELECTRIC DAMP CONTROLLED THREE-END SHAFT DIFFERENTIAL TRANSMISSION

(76) Inventor: Tai-Her Yang, 6F-5 No. 250, Sec. 4, Chung Hsiao E. Rd., Taipei (TW)

( * ) Notice: Subject to any disclaimer, the term of this patent is extended or adjusted under 35 U.S.C. 154(b) by 307 days.

(21) Appl. No.: 11/512,388

(22) Filed: Aug. 30, 2006

(65) Prior Publication Data

US 2008/0058149 A1 Mar. 6, 2008

(51) Int. Cl.
*F16H 3/72* (2006.01)
(52) U.S. Cl. .......................................... 475/150; 477/3
(58) Field of Classification Search ............... 475/5, 475/149, 150; 477/3
See application file for complete search history.

(56) References Cited

U.S. PATENT DOCUMENTS 2,436,582 A * 2/1948 Lear ................ 318/8
2,436,936 A * 3/1948 Page ................ 318/8
7,261,660 B2 * 8/2007 Sowul et al. ........... 475/5
7,261,663 B2 * 8/2007 Miller et al. .......... 475/215

* cited by examiner

Primary Examiner—Ha D. Ho
(74) Attorney, Agent, or Firm—Bacon & Thomas, PLLC

(57) ABSTRACT

An electric damp controlled three-end shaft differential transmission including a revolving electro-mechanical installation disposed between both differential output ends to create vortex power generation effects or generator effects in differential operation to output power for producing counter torque damp; or when two revolving electro-mechanical installations being respectively adapted to both differential output ends, the higher power generated by the revolving electro-mechanical installation with higher power generation voltage drives the other revolving electro-mechanical installation with lower power generation voltage to regulate and control the torque ratio between both differential output ends.

31 Claims, 12 Drawing Sheets

ELECTRIC DAMP CONTROLLED THREE-END SHAFT DIFFERENTIAL TRANSMISSION

BACKGROUND OF THE INVENTION (a) Field of the Invention

The present invention is related to an electric damp controlled three-end shaft differential transmission, and more particularly, to one that has a revolving electro-mechanical installation to replace a differential limiting mechanism provided in a conventional automated differential, and limiting type of differential device so to correct the flaws of temperature rising and heat loss due to activation by friction. The present invention is advanced due to:

(1) In case of any differential output end is idling, the friction type of anti slide limit structure of the prior art suffers heat loss; the present invention converts the differential kinetics into power for generation to be stored in a rechargeable device;

(2) In case of any differential output end is idling, the torque ratio of the output from both differential output ends with the conventional differential limiting type is fixed; instead, the output torque from both differential output ends of the present invention can be controlled and regulated; and (3) The present invention when supplied with power from a rechargeable device operates as a motor by driving the revolving electro-mechanical installation through a controller, thus to provide active drive the differential output end.

(b) Description of the Prior Art

A three-end shaft differential transmission of the prior art has an input end to receive revolving kinetics for driving both differential output ends; the three-end shaft differential transmission includes a revolving differential gear set, a planetary gear differential gear set or any other differential gear set that provides the similar functions; for the application in driving a carrier, both differential output ends are usually used to drive the transmission gear sets or tracks provided on both sides of the carrier; or to serve as an intermediate differential gear set to drive the front and the rear gear sets of the carrier.

If any differential output end idles in a three-end shaft gear set, another differential output end loses its revolving kinetics thus fails to drive the load; therefore, an improvement is made by adopting a differential gear to automatically limit the differential speed; however, in a anti-slip limiting structure of the differential gear of automatic differential limit type, a mechanical device such as a friction plate or a toothed automatic clutch, or a dry or a wet friction thrust plate is provided at where between both differential output ends for control and regulating purposes; the mechanical differential limiting device is found with the following flaws: (1) significant heat lose due to the heat generated by friction in the course of executing the differential limit; (2) service life of the mechanical parts is comparatively shorter; and (3) in case of either differential output end idles, the driving torque to drive gear sets on both sides as driven by the automatic differential limit type of differential gear is prevented from regulation and control at will due to the torque indicates a fixed ratio.

SUMMARY OF THE INVENTION

The primary purpose of the present invention is to provide an electric damp controlled three-end shaft differential transmission. Wherein, a revolving electro-mechanical installation is disposed at where between both differential output ends of the differential transmission so to create vortex power generation effects or generator effects when outputs indicate differential operation, thus to output power of generation to produce damp of counter-torque; or alternatively, two revolving electro-mechanical installations are respectively adapted to both differential output ends so that the comparatively higher power generated by the revolving electro-mechanical installation with higher power generation voltage drives the other revolving electro-mechanical installation with lower power generation voltage to regulate and control the torque ratio between both differential output ends.

DETAILED DESCRIPTION OF THE PREFERRED EMBODIMENTS

The present invention has a revolving electro-mechanical installation directly or by means of a transmission coupled to where between two differential output ends of a three-end shaft differential transmission so to produce damp either by the electric vortex power generation effects produced, or by generator effects produced that supply power generated to charge a rechargeable device, or to regulate and control the torque ratio of both differential output ends by the revolving electro-mechanical installation driven by the power from the rechargeable device to function as a motor when both differential output ends are in differential status.

Furthermore, two revolving electro-mechanical installations are respectively adapted to both differential output ends so that once both differential output ends are engaging in differential operation, the power from the revolving electro-mechanical installation running at higher rpm and higher voltage drives the other revolving electro-mechanical installation running at lower rpm and lower voltage to function as a motor for regulating and controlling the torque ratio of those two differential output ends.

Figure 1:
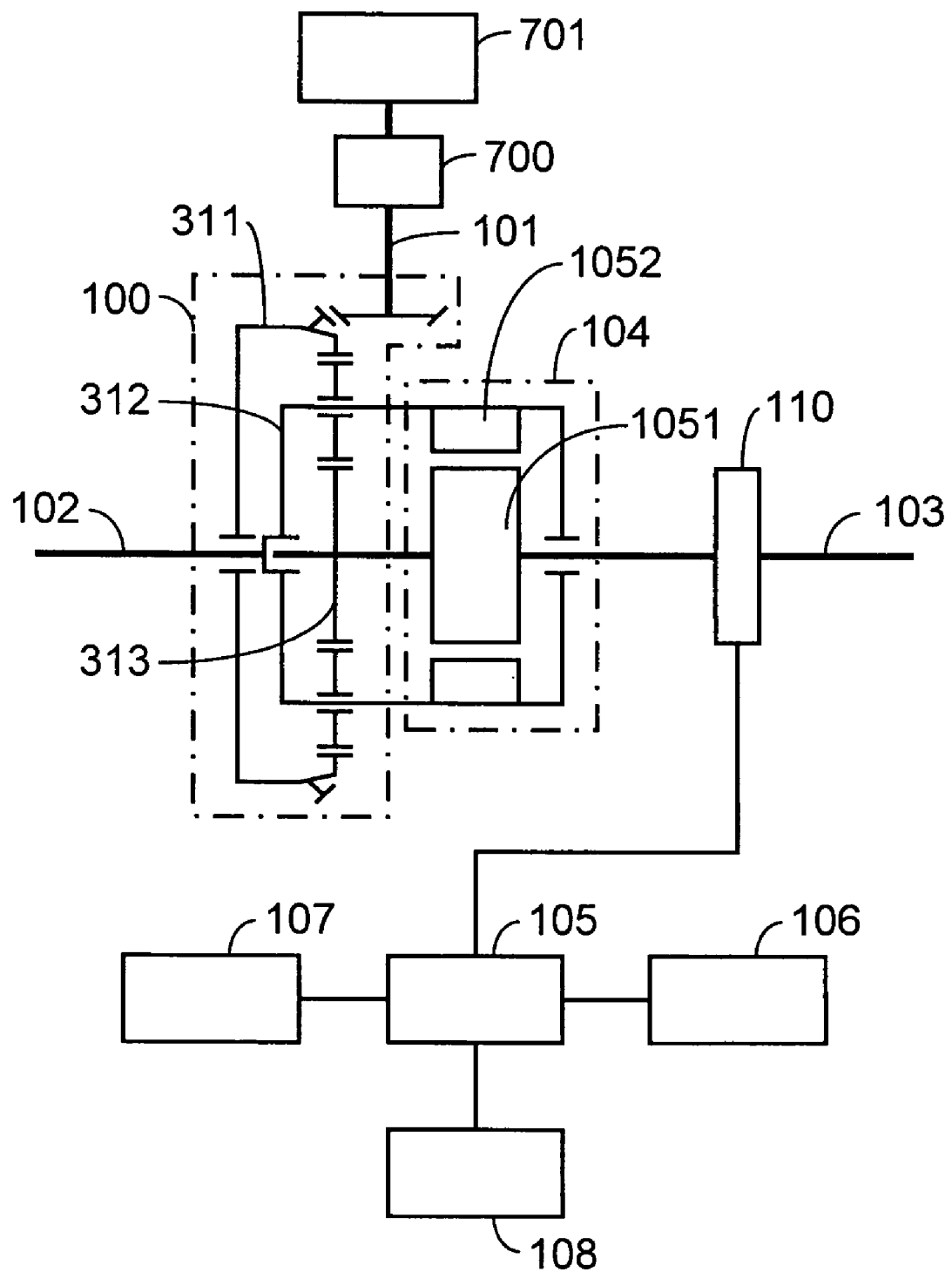
FIG. 1 is a schematic view showing that a preferred embodiment of the present invention applied in planetary differential gear set adapted with a built-in dual action type revolving electro-mechanical installation.

By a multiple of preferred embodiments, the three-end shaft differential transmission regulated and controlled by electric damp of the present invention is described as follows:

Referring to FIG. 1 for a schematic view showing that a preferred embodiment of the present invention applied in planetary differential gear set adapted with a built-in dual action type revolving electro-mechanical installation, the preferred embodiment is essentially comprised of:

a planetary three-end shaft differential gear set 100: relates to a planetary differential gear set or other three-end shaft differential gear set providing similar functions of the prior art, having its input shaft 101 to input revolving kinetics fed from an engine, or a motor, or other revolving power source 701 to drive external gear 311; its first differential output end 102 coupled to the differential gear rocker 312 from a planetary gear set with the second differential output end 103 coupled to a sun gear 313; one end of the second differential output end 103 coupled to a first electro-mechanical revolution block 1051 from the dual action type revolving electro-mechanical installation 104; one end of the first differential output end 102 coupled to a second electro-mechanical revolution block 1052 from the dual action type revolving electro-mechanical installation 104; and a conduction ring with brush 110 disposed to the second differential output end 103 for the dual action type revolving electro-mechanical installation 104 to engage in external transmission of electric power;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

the dual action type revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the second differential output end 103 and the second electro-mechanical revolution block 1052 being coupled to the first differential output end 102; and subject to a controller 105 by having its electric power transmitted by an optional conduction ring with brush 110;

the conduction ring with brush 110: an optional item comprised of a contact conduction structure of a conduction ring and a conduction brush, or a non-contact type induction conduction structure provided with a primary and a secondary induction windings to transmit electric power between the dual action type revolving electro-mechanical installation 104 and the controller 105;

the controller 105: comprised of dynamo-electric switch device, over current protection, over voltage protection, or solid-state electronic device, or a microprocessor and related software, the controller 105 is essentially provided for controlling the strong current transmitted among the dual action type revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: related to an optional item comprised of a rechargeable battery, capacitor, or super capacitor;

the power driven load 107: an optional load electric appliance that inputs and converts electric power into thermal, mechanical, optical, acoustic, or chemical energy; and a setup control circuit device 108: relates to an optional item comprised of dynamo-electric device, electronic device, wire or wireless signal transmission interface, or manual operation interface device, microprocessor and related software to receive setup signals for controlling the controller 105.

Figure 2:
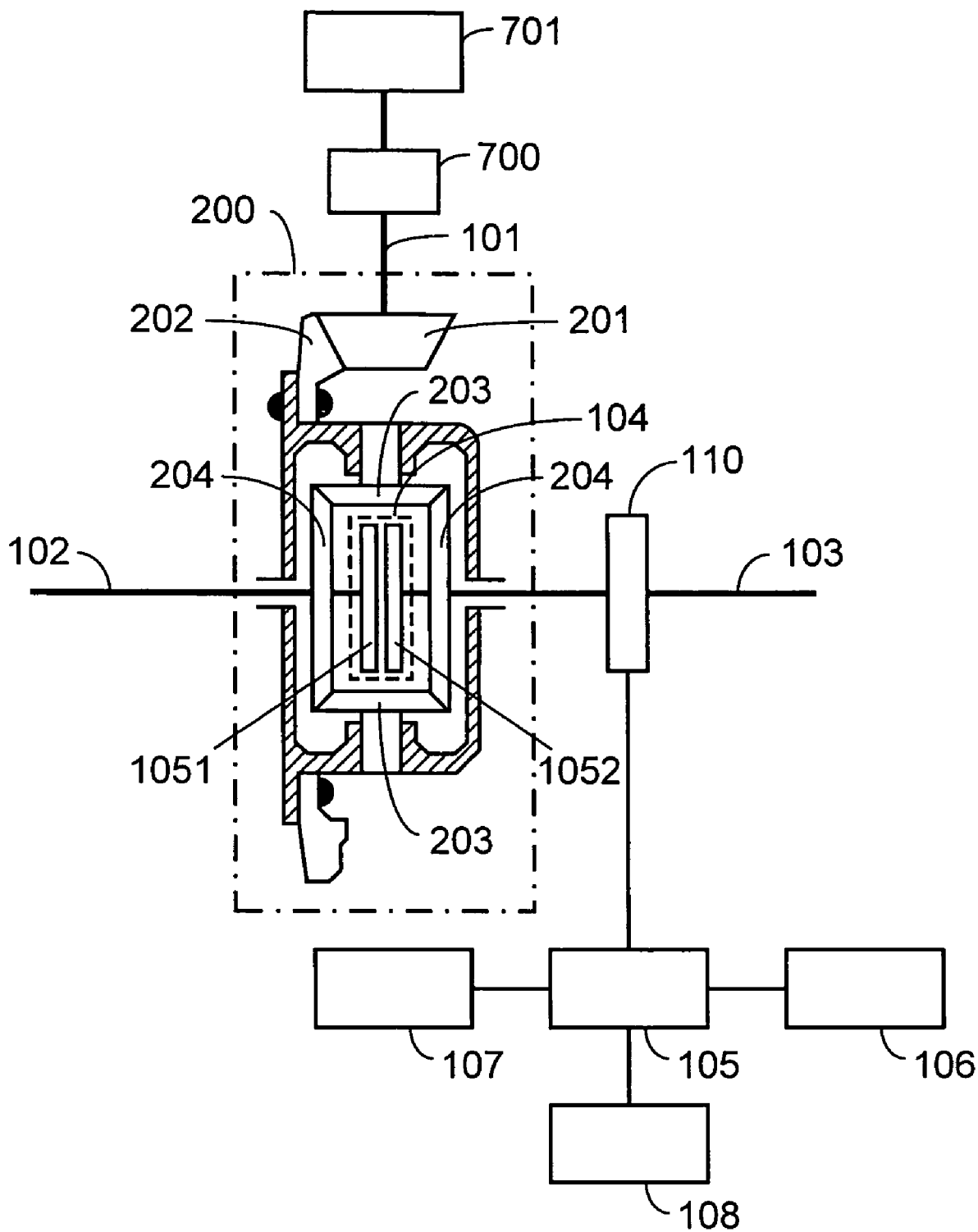
FIG. 2 is a schematic view showing that a preferred embodiment of the present invention applied in revolving gear set adapted with a built-in dual action type revolving electro-mechanical installation.

The preferred embodiment of the present invention as illustrated in FIG. 1 provides the following function:

(1) When both of the first and the second differential output ends 102, 103 revolve at the same speed and in the same direction, both of the first and the second electro-mechanical revolution blocks 1051, 1052 of the dual action type revolving electro-mechanical installation 104 operate in the same direction and at the same speed; in this case, there is the absence of electro-mechanical effects;

(2) When the system engages in differential operation, and the rotation speed of the first differential output end 102 is greater than that of the second differential output end 103, the dual action type revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102;

(3) When the system engages in differential operation, and the rotation speed of the second differential output end 103 is greater than that of the first differential output end 102, the dual action type revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103;

(4) When the system engages in differential operation, and the rotation speed of the first differential output end 102 is greater than that of the second differential output end 103, the rechargeable device 106 outputs power to the dual action type revolving electro-mechanical installation 104 for the dual action type revolving electro-mechanical installation 104 to function as a motor, its output torque direction is such that to create a feedback torque at the dual action type revolving electro-mechanical installation 104, and in turn the kinetics from the feedback torque drives the second differential output end 103 for reducing the torque difference between the first and the second differential output ends 102, 103;

(5) When the system engages in differential operation, and the rotation speed of the second differential output end 103 is greater than that of the first differential output end 102, the rechargeable device 106 outputs power to the dual action type revolving electro-mechanical installation 104 for the dual action type revolving electro-mechanical installation 104 to function as a motor, its output torque direction is such that to create a feedback torque at the dual action type revolving electro-mechanical installation 104, and in turn the kinetics from the feedback torque drives the first differential output end 102 for reducing the torque difference between the first and the second differential output ends 102, 103;

(6) When the clutch 700 is disposed to the system, the clutch 700 is controlled to indicate disengaged status to leave the electric power from the rechargeable device 106 to drive the dual action type revolving electro-mechanical installation 104 to drive both of the first and the second differential output ends 102, 103 to revolve in the same direction;

FIG. 2 is a schematic view showing that a preferred embodiment of the present invention applied in a revolving gear set adapted with a built-in dual action type revolving electro-mechanical installation; the preferred embodiment is essentially comprised of:

the revolving type three-end shaft differential gear set 200: relates to a revolving differential gear set or other three-end shaft differential gear set providing similar functions of the prior art, having its input shaft 101 to receive revolving kinetics from an engine, or a motor, or other revolving power source 701 to drive a disk type gear 202 through a mushroom pinion 201 to further draw both side differential gears 204 through a differential pinion gear 203 for both side differential gears 204 to respectively drive the first and the second differential output ends 102, 103;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

one end of the first differential output end 102 is coupled to the first electro-mechanical revolution block 1051 of the dual action type revolving electro-mechanical installation 104;

one end of the second differential output end 103 is coupled to the second electro-mechanical revolution block 1052 of the dual action type revolving electro-mechanical installation 104; and the conduction ring with brush 110 is disposed to the first or the second differential output end 102, 103 for the dual action type revolving electro-mechanical installation 104 to engage in external transmission of power;

the dual action type revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the first differential output end 102 and the second electro-mechanical revolution block 1052 being coupled to the second differential output end 103; and having its electric power transmitted by an optional conduction ring with brush 110 subject to the controller 105;

the conduction ring with brush 110: an optional item comprised of a contact conduction structure of a conduction ring and a conduction brush, or a non-contact type induction conduction provided with a primary and a secondary induction windings to transmit electric power between the dual action type revolving electro-mechanical installation 104 and the controller 105;

the controller 105: comprised of dynamo-electric switch device, over current and over voltage protection, or solid-state electronic device, or a microprocessor and related software; the controller 105 is essentially provided for controlling the strong current transmitted among the dual action type revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: an optional item related to a rechargeable battery, capacitor, or super capacitor;

the power driven load 107: an optional load electric appliance that inputs and converts electric power into thermal, mechanical, optical, acoustic, or chemical energy; and a setup control circuit device 108: relates to an optional item comprised of dynamo-electric device, electronic device, wire or wireless signal transmission interface, or manual operation interface device, microprocessor and related software to receive setup signals for controlling the controller 105.

The preferred embodiment of the present invention illustrated in FIG. 2 provides the following functions:

(1) When both of the first and the second differential output ends 102, 103 revolve at the same speed and in the same direction, both of the first and the second electro-mechanical revolution blocks 1051, 1052 of the dual action type revolving electro-mechanical installation 104 operate in the same direction and at the same speed; in this case, there is the absence of electro-mechanical effects;

(2) When the system engages in differential operation, and the rotation speed of the first differential output end 102 is greater than that of the second differential output end 103, the dual action type revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102;

(3) When the system engages in differential operation, and the rotation speed of the second differential output end 103 is greater than that of the first differential output end 102, the dual action type revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103;

(4) When the system engages in differential operation, and the rotation speed of the first differential output end 102 is greater than that of the second differential output end 103, the rechargeable device 106 outputs power to the dual action type revolving electro-mechanical installation 104 for the dual action type revolving electro-mechanical installation 104 to function as a motor, its output torque direction is such that to create a feedback torque at the dual action type revolving electro-mechanical installation 104, and in turn the kinetics from the feedback torque drives the second differential output end 103 for reducing the torque difference between the first and the second differential output ends 102, 103;

(5) When the system engages in differential operation, and the rotation speed of the second differential output end 103 is greater than that of the first differential output end 102, the rechargeable device 106 outputs power to the dual action type revolving electro-mechanical installation 104 for the dual action type revolving electro-mechanical installation 104 to function as a motor, its output torque direction is such that to create a feedback torque at the dual action type revolving electro-mechanical installation 104, and in turn the kinetics from the feedback torque drives the first differential output end 102 for reducing the torque difference between the first and the second differential output ends 102, 103;

(6) When the clutch 700 is disposed to the system, the clutch 700 is controlled to indicate disengaged status to leave the electric power from the rechargeable device 106 to drive the dual action type revolving electro-mechanical installation 104 to drive both of the first and the second differential output ends 102, 103 to revolve in the same direction.

Figure 3:
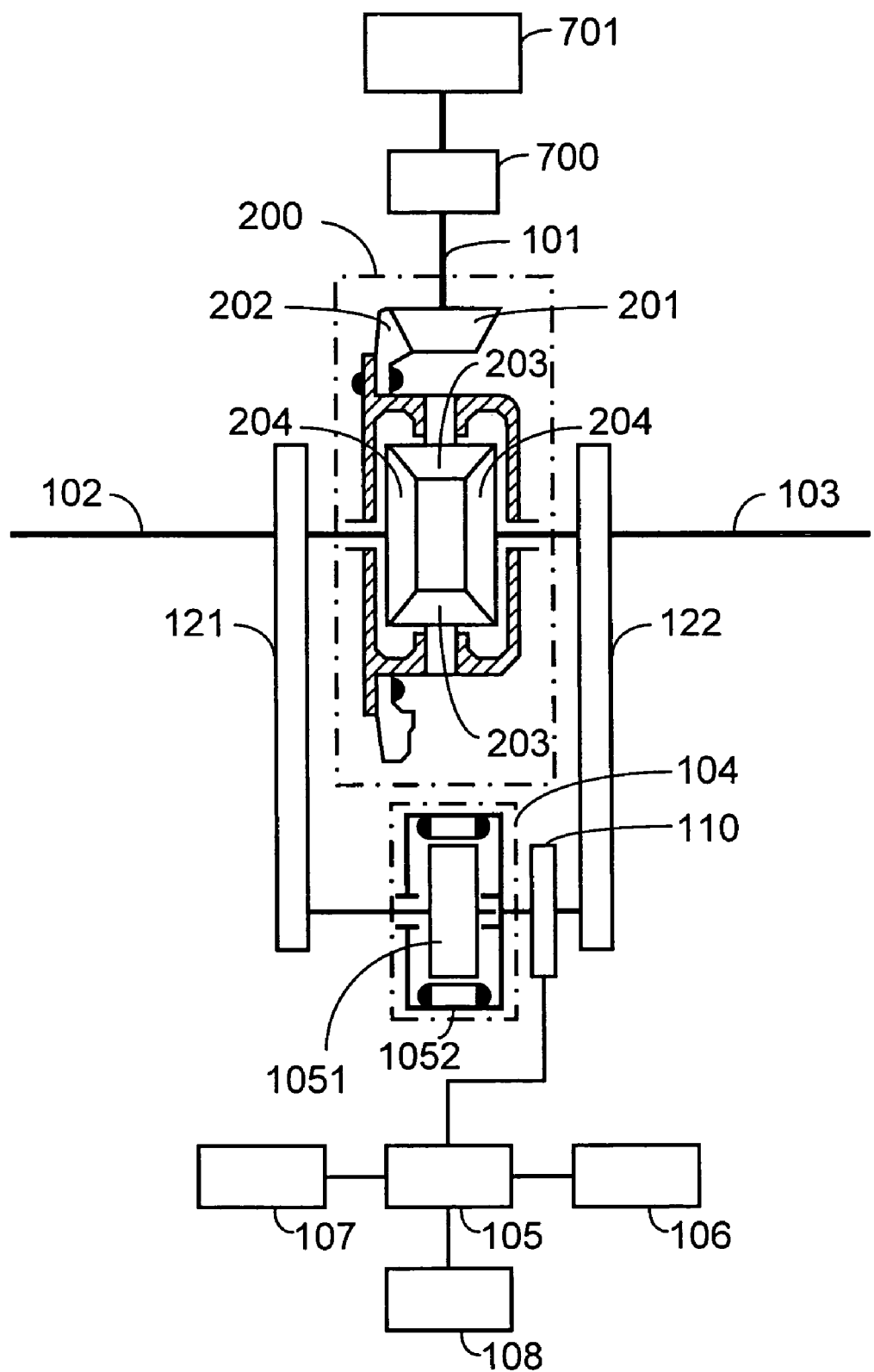
FIG. 3 is a schematic view showing that a preferred embodiment of the present invention applied in revolving gear set externally adapted with a dual action type revolving electro-mechanical installation.

FIG. 3 is a schematic view showing that a preferred embodiment of the present invention applied in a revolving gear set externally adapted with a dual action type revolving electro-mechanical installation; the preferred embodiment is essentially comprised of:

a revolving type three-end shaft differential gear set 200: relates to a revolving differential gear set or other three-end shaft differential gear set providing similar functions of the prior art, having its input shaft 101 to receive revolving kinetics from an engine, or a motor, or other revolving power source 701 to drive a disk type gear 202 through a mushroom pinion 201 to further draw both side differential gears 204 through a differential pinion gear 203 for both side differential gears 204 to respectively drive the first and the second differential output ends 102, 103;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

the first differential output end 102 drives the first electro-mechanical revolution block 1051 of the dual action type revolving electro-mechanical installation 104 through the transmission 121;

the second differential output end 103 drives the second electro-mechanical revolution block 1052 of the dual action type revolving electro-mechanical installation 104 through the transmission 122; and the conduction ring with brush 110 is disposed to the dual action type revolving electro-mechanical installation 104 for the dual action type revolving electro-mechanical installation 104 to engage in external transmission of electric power;

the dual action type revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the first differential output end 102 through the transmission 121 and the second electro-mechanical revolution block 1052 being coupled to the second differential output end 103 through the transmission 122; and having its electric power transmitted by an optional conduction ring with brush 110 subject to the controller 105;

the conduction ring with brush 110: an optional item provided on one side of the dual action type revolving electro-mechanical installation 104 and comprised of a contact conduction structure of a conduction ring and a conduction brush, or a non-contact type induction conduction having a primary and a secondary induction windings to transmit electric power between the dual action type revolving electro-mechanical installation 104 and the controller 105;

the controller 105: comprised of dynamo-electric switch device, over current protection, over voltage protection, or solid-state electronic device, or a microprocessor and related software; the controller 105 is essentially provided for controlling the strong current transmitted among the dual action type revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counterclockwise drive operation; the internal components and related circuit of the controller 105 may be selected as applicable;

the rechargeable device 106: related to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: related to an optional item comprised of dynamo-electric device, electronic device, wire or wireless signal transmission interface, or manual operation interface device, microprocessor and related software to receive setup signals for controlling the controller 105;

the transmissions 121, 122: each comprised of gear, chain, belt pulley, or toothed belt pulley, or other revolving transmission depending on the speed ratio and the revolving direction required with the relation between speed ratio and revolving direction described as follows:

(1) When both of the first and the second differential output ends 102, 103 revolve at the same speed and in the same direction, a static status without revolution difference is present between the first and the second electro-mechanical revolution blocks 1051, 1052 of the dual action type revolving electro-mechanical installation 104; and (2) When the rotation speeds between both of the first and the second differential output ends 102, 103 vary, the rotation speeds of the first and the second electro-mechanical revolution blocks 1051, 1052 of the dual action type revolving electro-mechanical installation 104 also vary so to provide functions of a generator.

The preferred embodiment of the present invention illustrated in FIG. 3 provides the following functions:

(1) When both of the first and the second differential output ends 102, 103 revolve at the same speed and in the same direction, both of the first and the second electro-mechanical revolution blocks 1051, 1052 of the dual action type revolving electro-mechanical installation 104 operate in the same direction and at the same speed; in this case, there is the absence of electro-mechanical effects.

(2) When the system engages in differential operation, and the rotation speed of the first differential output end 102 is greater than that of the second differential output end 103, the dual action type revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102.

(3) When the system engages in differential operation, and the rotation speed of the second differential output end 103 is greater than that of the first differential output end 102, the dual action type revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103.

(4) When the system engages in differential operation, and the rotation speed of the first differential output end 102 is greater than that of the second differential output end 103, the rechargeable device 106 outputs power to the dual action type revolving electro-mechanical installation 104 for the dual action type revolving electro-mechanical installation 104 to function as a motor, its output torque direction is such that to create a feedback torque at the dual action type revolving electro-mechanical installation 104, and in turn the kinetics from the feedback torque drives the second differential output end 103 for reducing the torque difference between the first and the second differential output ends 102, 103.

(5) When the system engages in differential operation, and the rotation speed of the second differential output end 103 is greater than that of the first differential output end 102, the rechargeable device 106 outputs power to the dual action type revolving electro-mechanical installation 104 for the dual action type revolving electro-mechanical installation 104 to function as a motor, its output torque direction is such that to create a feedback torque at the dual action type revolving electro-mechanical installation 104, and in turn the kinetics from the feedback torque drives the first differential output end 102 for reducing the torque difference between the first and the second differential output ends 102, 103.

(6) When the clutch 700 is disposed to the system, the clutch 700 is controlled to indicate disengaged status to leave the electric power from the rechargeable device 106 to drive the dual action type revolving electro-mechanical installation 104 to drive both of the first and the second differential output ends 102, 103 to revolve in the same direction.

Figure 4:
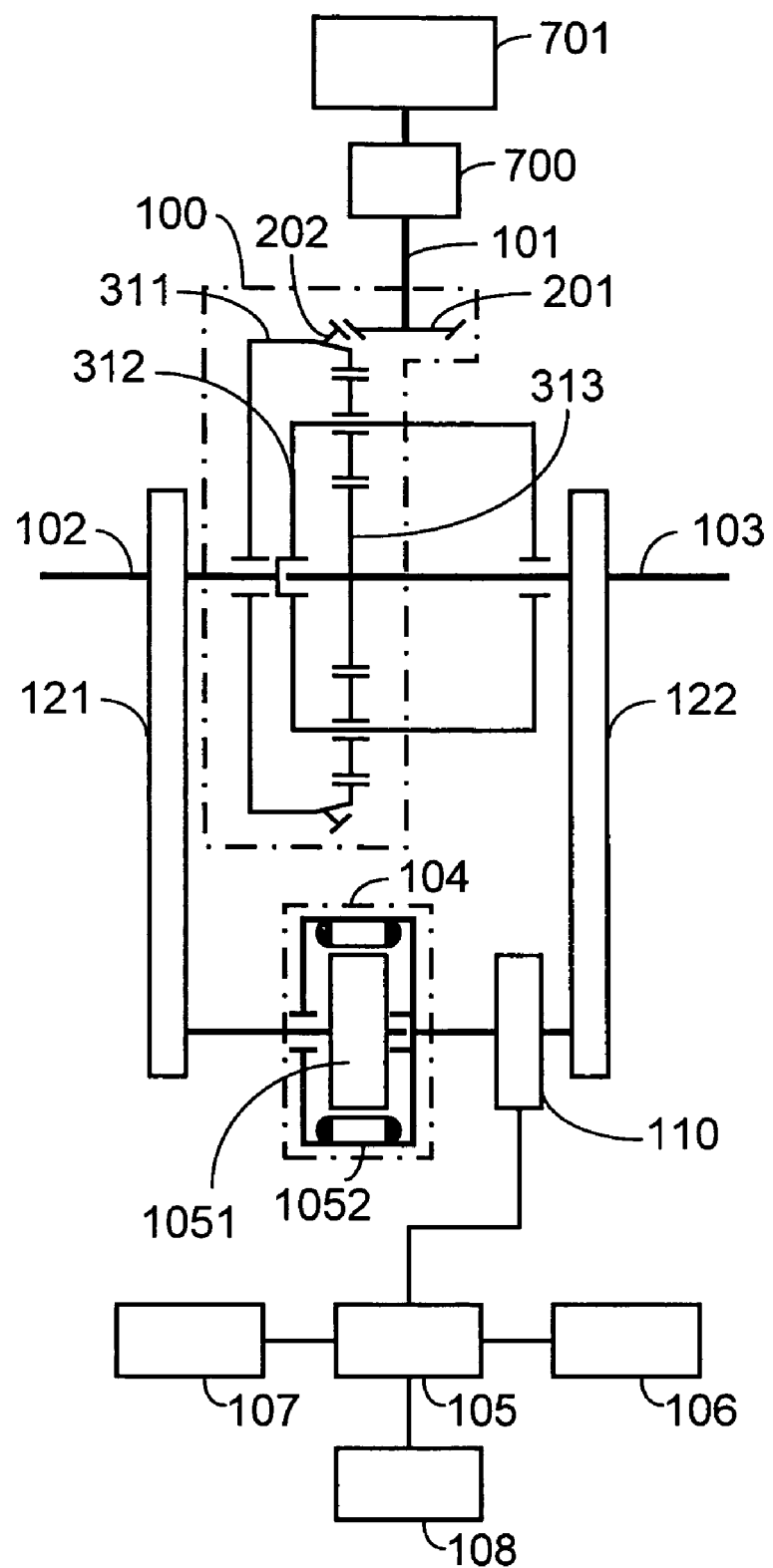
FIG. 4 is a schematic view showing that a preferred embodiment of the present invention applied in planetary gear set externally adapted with a dual action type revolving electro-mechanical installation.

FIG. 4 is a schematic view showing that a preferred embodiment of the present invention applied in a planetary differential gear set externally adapted with a dual action type revolving electro-mechanical installation. The preferred embodiment is essentially comprised of:

a planetary three-end shaft differential gear set 100: relates to a planetary differential gear set or other three-end shaft differential gear set providing similar functions of the prior art, having its input shaft 101 to input revolving kinetics fed from an engine, or a motor, or other revolving power source 701 to drive the disk type gear 202 through the mushroom pinion 201 thus to further drive an external gear 311; its first differential output end 102 coupled to the differential gear rocker 312 from a planetary gear set with the second differential output end 103 coupled to a sun gear 313; one end of the second differential output end 103 coupled through the transmission 122 to a second electro-mechanical installation revolution block 1052 from a dual action type revolving electro-mechanical installation 104; one end of the first differential output end 102 coupled through the transmission 121 to a first electro-mechanical revolution block 1051 from the dual action type revolving electro-mechanical installation 104; and a conduction ring with brush 110 disposed on the dual action type revolving electro-mechanical installation 104 for the dual action type revolving electro-mechanical installation 104 to engage in external transmission of electric power;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

the dual action type revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the first differential output end 102 through the transmission 121 and the second electro-mechanical revolution block 1052 being coupled to the second differential output end 103 through the transmission 122; and having its electric power transmitted by an optional conduction ring with brush 110 subject to the controller 105;

the conduction ring with brush 110: an optional item provided on one side of the dual action type revolving electro-mechanical installation 104 and comprised of a contact conduction structure of a conduction ring and a conduction brush, or a non-contact type induction conduction having a primary and a secondary induction windings to transmit electric power between the dual action type revolving electro-mechanical installation 104 and the controller 105;

the controller 105: comprised of dynamo-electric switch device, over current protection, over voltage protection, or solid-state electronic device, or a microprocessor and related software; the controller 105 is essentially provided for controlling the strong current transmitted among the dual action type revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: relates to an optional item comprised of dynamo-electric device, electronic device, wire or wireless signal transmission interface, or manual operation interface device, microprocessor and related software to receive setup signals for controlling the controller 105;

the transmissions 121, 122: comprised of gear, chain, belt pulley, or toothed belt pulley, or other revolving transmission depending on the speed ratio and the revolving direction required with the relation between speed ratio and revolving direction described as follows:

(1) When both of the first and the second differential output ends 102, 103 revolve at the same speed and in the same direction, a static status without revolution difference is present between the first and the second electro-mechanical revolution blocks 1051, 1052 of the dual action type revolving electro-mechanical installation 104; and (2) When the rotation speeds between both of the first and the second differential output ends 102, 103 vary, the rotation speeds of the first and the second electro-mechanical revolution blocks 1051, 1052 of the dual action type revolving electro-mechanical installation 104 also vary so to provide functions of a generator.

The preferred embodiment of the present invention illustrated in FIG. 4 provides the following functions:

(1) When both of the first and the second differential output ends 102, 103 revolve at the same speed and in the same direction, both of the first and the second electro-mechanical revolution blocks 1051, 1052 of the dual action type electro-mechanical installation 104 operate in the same direction and at the same speed; in this case, there is the absence of electro-mechanical effects.

(2) When the system engages in differential operation, and the rotation speed of the first differential output end 102 is greater than that of the second differential output end 103, the dual action type revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102.

(3) When the system engages in differential operation, and the rotation speed of the second differential output end 103 is greater than that of the first differential output end 102, the dual action type revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103.

(4) When the system engages in differential operation and the rotation speed of the first differential output end 102 is greater than that of the second differential output end 103, the rechargeable device 106 outputs power to the dual action type revolving electro-mechanical installation 104 for the dual action type revolving electro-mechanical installation 104 to function as a motor, its output torque direction is such that to create a feedback torque at the dual action type revolving electro-mechanical installation 104, and in turn the kinetics from the feedback torque drives the second differential output end 103 for reducing the torque difference between the first and the second differential output ends 102, 103.

(5) When the system engages in differential operation, and the rotation speed of the second differential output end 103 is greater than that of the first differential output end 102, the rechargeable device 106 outputs power to the dual action type revolving electro-mechanical installation 104 for the dual action type revolving electro-mechanical installation 104 to function as a motor, its output torque direction is such that to create a feedback torque at the dual action revolving electro-mechanical installation 104, and in turn the kinetics from the feedback torque drives the first differential output end 102 for reducing the torque difference between the first and the second differential output ends 102, 103.

(6) When the clutch 700 is disposed to the system, the clutch 700 is controlled to indicate disengaged status to leave the electric power from the rechargeable device 106 to drive the dual action type revolving electro-mechanical installation 104 to drive both of the first and the second differential output ends 102, 103 to revolve in the same direction.

Figure 5:
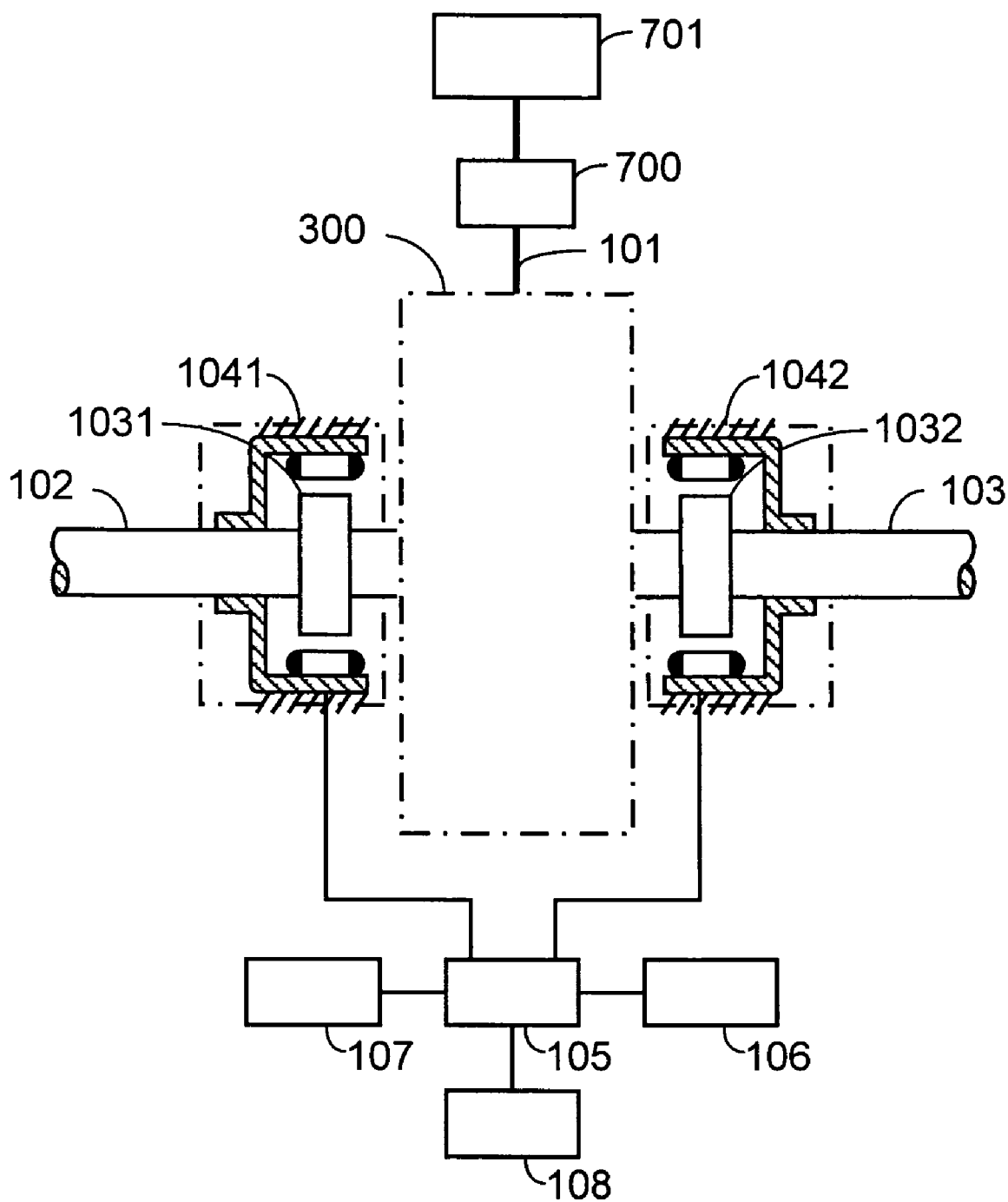
FIG. 5 is a schematic view showing a preferred embodiment of the present invention having at two differential output ends of a three-end shaft differential gear set coupled to a revolving electro-mechanical installation.

FIG. 5 is a schematic view showing a preferred embodiment of the present invention having at two differential output ends of a three-end shaft differential gear set respectively coupled to a revolving electro-mechanical installation. The preferred embodiment is essentially comprised of:

a three-end shaft differential gear set 300: relates to a planetary or revolving type differential gear set or other three-end shaft differential gear set providing similar functions of the prior art, provided with an input shaft 101 to input revolving kinetics fed from an engine, or a motor, or other revolving power source 701, a first differential output end 102, and a second differential output end 103;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

the first differential output end 102 is coupled to the electro-mechanical rotation part 1031 of a revolving electro-mechanical installation 1041; and the second differential output end 103 is coupled to the electro-mechanical rotation part 1032 of another revolving electro-mechanical installation 1042; the static part of the revolving electro-mechanical installation 1041 is locked to a static casing; and that of the revolving electro-mechanical installation 1042 is also locked to a static casing; and the three-end shaft differential gear set 300 may be replaced by any other three-end shaft differential gear set providing similar functions;

the revolving electro-mechanical installation 1041: comprised of AC or DC, brush or brushless, synchronous or asynchronous revolving electro-mechanical installation provided with a stationary electro-mechanical static part and an electro-mechanical rotation part 1031 with its electro-mechanical rotation part 1031 to be coupled to the first differential output end 102 that functions as a motor or as a generator; constructed in a cylindrical, disk or any other geometric form; and subject the control by the controller 105;

the revolving electro-mechanical installation 1042: comprised of AC or DC, brush or brushless, synchronous or asynchronous revolving electro-mechanical installation provided with a stationary electro-mechanical static part and an electro-mechanical rotation part 1032 with its electro-mechanical rotation part 1032 to be coupled to the second differential output end 103 that functions as a motor or as a generator; constructed in a cylindrical, disk or any other geometric form; and subject the control by the controller 105;

the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installation 1041, 1042, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy; and a setup control circuit device 108: relates to an optional item comprised of dynamo-electric device, electronic device, wire or wireless signal transmission interface, or manual operation interface device, microprocessor and related software or receive setup signals for controlling the controller 105.

The preferred embodiment of the present invention as illustrated in FIG. 5 provides the following functions:

(1) Both revolving electro-mechanical installations 1041, 1042 are directly or by means of connecting to the controller 105 connected in parallel of the same polarity.

(2) When both of the first and the second differential output ends 102, 103 are driving at the same speed, the generation voltage is the same for both of the revolving electro-mechanical installations 1041, 1042 connected at the same polarity to each other in parallel, and both of the revolving electro-mechanical installations 1041, 1042 are in stand-by status since there is no current flowing between them.

(3) When the system is engaging in differential operation and the rotation speed of the first differential output end 102 is greater than that of the second differential output end 103, the generation voltage of the revolving electro-mechanical installation 1041 gets higher than that of the revolving electro-mechanical installation 1042, and the current flows from the revolving electro-mechanical installation 1041 to the revolving electro-mechanical installation 1042; whereas the revolving electro-mechanical installation 1041 is operating as a generator, the current outputted produces the counter torque, and the revolving electro-mechanical installation 1042 operates as a motor to produce torque for both revolving electro-mechanical installations 1041, 1042 to provide auxiliary function for each other in jointly driving the second differential output end 103.

(4) When the system is engaging in differential operation and the rotation speed of the second differential output end 103 is greater than that of the first differential output end 102, the generation voltage of the revolving electro-mechanical installation 1042 gets higher than that of the revolving electro-mechanical installation 1041, and the current flows from the revolving electro-mechanical installation 1042 to the revolving electro-mechanical installation 1041; whereas the revolving electro-mechanical installation 1042 is operating as a generator, the current outputted produces the counter torque, and the revolving electro-mechanical installation 1041 operates as a motor to produce torque for both revolving electro-mechanical installations 1041, 1042 to provide auxiliary function for each other in jointly driving the second differential output end 103.

(5) Once the rechargeable device 106 is adapted to the system, either or both of the revolving electro-mechanical installations 1041, 1042 is driven by the revolving kinetics from the input shaft 101 or by the inertial kinetics from the load to charge the rechargeable device 106.

(6) Power outputted from the rechargeable device 106 drives either or both of the revolving electro-mechanical installations 1041, 1042 to drive and operate as the function of a motor.

(7) When both of the first and the second differential output ends 102, 103 are engaging in differential operation, they are subject to the regulation and control of torque distribution through the controller 105 in both functions described in the preceding subparagraphs (3) and (4).

(8) The system operates under the control by an external system by means of the setup control circuit device 108.

(9) When the clutch 700 is disposed to the system, the clutch 700 is controlled to indicate disengaged status to leave the electric power from the rechargeable device 106 to drive either or both of the electro-mechanical rotation parts 1031, 1032 respectively of the revolving electro-mechanical installations 1041 and 1042 so to respectively drive the first and the second differential output ends 102, 103 to engage in driving operation in the same revolving direction or in different revolving directions.

Figure 6:
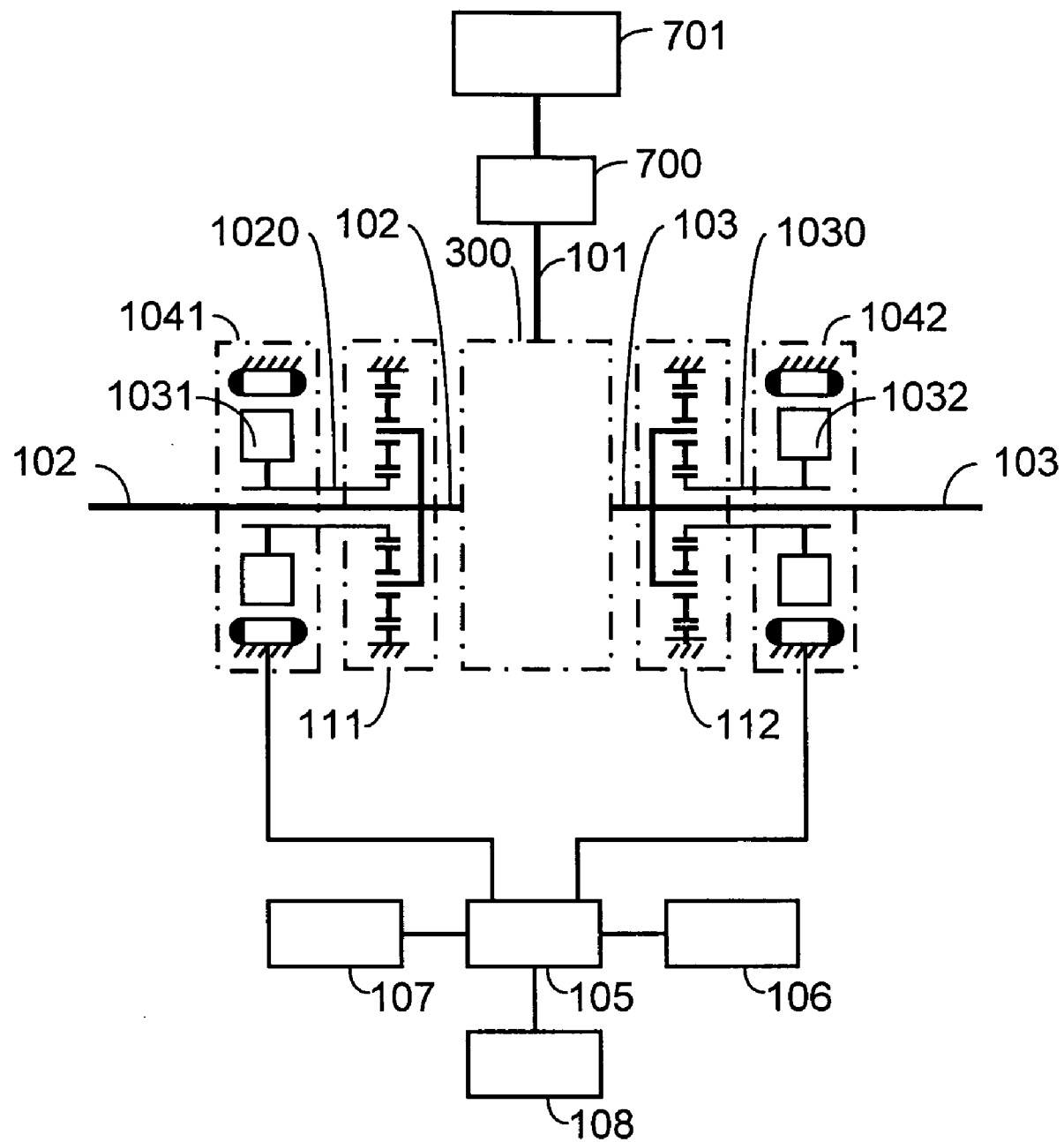
FIG. 6 is a schematic view showing the preferred embodiment that has a transmission disposed between differential output ends and revolving electro-mechanical installations that respectively coupled to the differential output ends taken from FIG. 5.

FIG. 6 is a schematic view showing the preferred embodiment that has a transmission disposed between differential output ends revolving electro-mechanical installations that respectively coupled to the differential output ends taken from FIG. 5. The preferred embodiment is essentially comprised of:

a three-end shaft differential gear set 300: relates to a planetary or revolving type differential gear set or other three-end shaft differential gear set providing similar functions of the prior art, provided with an input shaft 101 to input revolving kinetics fed from an engine, or a motor, or other revolving power source 701, a first differential output end 102, and a second differential output end 103;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

revolving kinetics from the first differential output ends 102 drive a transmission 111 comprised coaxially of a planetary gear set to drive the electro-mechanical rotation part 1031 of the revolving electro-mechanical installation 1041 through an output end 1020 of the transmission 111;

revolving kinetics from the second differential output ends 103 drive a transmission 112 comprised coaxially of a planetary gear set to drive the electro-mechanical rotation part 1032 of the revolving electro-mechanical installation 1042 through an output end 1030 of the transmission 112; the static part of the revolving electro-mechanical installation 1041 is locked to a static casing; and that of the revolving electro-mechanical installation 1042 is also locked to a static casing; and the three-end shaft differential gear set 300 may be replaced by any other three-end shaft differential gear set providing similar functions;

the revolving electro-mechanical installation 1041: comprised of AC or DC, brush or brushless, synchronous or asynchronous revolving electro-mechanical installation provided with a stationary electro-mechanical static part and an electro-mechanical rotation part 1031 with its electro-mechanical rotation part 1031 to be coupled to the output end 1020 of the transmission 111; both of the electro-mechanical rotation part 1031 of the revolving electro-mechanical installation 1041 and the output end 1020 of the transmission 111 coupled to it are each provided with a through hole for the insertion for installation by the first differential output end 102 and its bearing that functions as a motor or as a generator; constructed in a cylindrical, disk or any other geometric form; and subject the control by the controller 105;

the revolving electro-mechanical installation 1042: comprised of AC or DC, brush or brushless, synchronous or asynchronous revolving electro-mechanical installation provided with a stationary electro-mechanical static part and an electro-mechanical rotation part 1032 with its electro-mechanical rotation part 1032 to be coupled to the second differential output end 103 of the transmission 112; both of the electro-mechanical rotation part 1032 of the revolving electro-mechanical installation 1042 and the output end 1030 of the transmission 112 coupled to it are each provided with a through hole for the insertion for installation by the second differential output end 103 and its bearing that functions as a motor or as a generator; constructed in a cylindrical, disk or any other geometric form; and subject the control by the controller 105;

the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installations 1041, 1042, a rechargeable device 106, and a power driven load 107; in addition to receiving operation signals a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: relates to an optional item comprised of dynamo-electric device, electronic device, wire or wireless signal transmission interface, or manual operation interface device, microprocessor and related software to receive setup signals for controlling the controller 105; and the transmissions 111, 112: each relates to a coaxially transmission, such as a planetary gear set, comprised of gear, chain, belt pulley, or toothed belt pulley, or other revolving transmission depending on the speed ratio required; when the input shafts of both transmissions revolve in the same direction, the output shafts of both transmissions 111, 112 are also revolving in the same direction.

The preferred embodiment of the present invention as illustrated in FIG. 6 provides the following functions:

(1) Both revolving electro-mechanical installations 1041, 1042 are directly or by means of connecting to the controller 105 connected in parallel of the same polarity.

(2) When both of the first and the second differential output ends 102, 103 are driving at the same speed, the generation voltage is the same for both of the revolving electro-mechanical installations 1041, 1042 connected at the same polarity to each other in parallel, and both of the revolving electro-mechanical installations 1041, 1042 are in stand-by status since there is no current flowing between them.

(3) When the system is engaging in differential operation and the rotation speed of the first differential output end 102 is greater than that of the second differential output end 103, the generation voltage of the revolving electro-mechanical installation 1041 gets higher than that of the revolving electro-mechanical installation 1042, and the current flows from the revolving electro-mechanical installation 1041 to the revolving electro-mechanical installation 1042; whereas the revolving electro-mechanical installation 1041 is operating as a generator, the current outputted produces the counter torque, and the revolving electro-mechanical installation 1042 operates as a motor to produce torque for both revolving electro-mechanical installations 1041, 1042 to provide auxiliary function for each other in jointly driving the second differential output end 103.

(4) When the system is engaging in differential operation and the rotation speed of the second differential output end 103 is greater than that of the first differential output end 102, the generation voltage of the revolving electro-mechanical installation 1042 gets higher than that of the revolving electro-mechanical installation 1041, and the current flows from the revolving electro-mechanical installation 1042 to the revolving electro-mechanical installation 1041; whereas the revolving electro-mechanical installation 1042 is operating as a generator, the current outputted produces the counter torque, and the revolving electro-mechanical installation 1041 operates as a motor to produce torque for both revolving electro-mechanical installations 1041, 1042 to provide auxiliary function for each other in jointly driving the second differential output end 103.

(5) Once the rechargeable device 106 is adapted to the system, either or both of the revolving electro-mechanical installations 1041, 1042 is driven by the revolving kinetics from the input shaft 101 or by the inertial kinetics from the load to charge the rechargeable device 106.

(6) Power outputted from the rechargeable device 106 drives either or both of the revolving electro-mechanical installations 1041, 1042 to drive and operate as function of a motor.

(7) When both of the first and the second differential output ends 102, 103 are engaging in differential operation, they are subject to the regulation and control of torque distribution through the controller 105 in both functions described in the preceding subparagraphs (3) and (4).

(8) The system operates under the control by an external system by means of the setup control circuit device 108.

(9) When the clutch 700 is disposed to the system, the clutch 700 is controlled to indicate disengaged status to leave the electric power from the rechargeable device 106 to drive either or both of the electro-mechanical rotation parts 1031, 1032 respectively of the revolving electro-mechanical installations 1041 and 1042 so to respectively drive the first and the second differential output ends 102, 103 to engage in driving operation in the same revolving direction or in different revolving directions.

Figure 7:
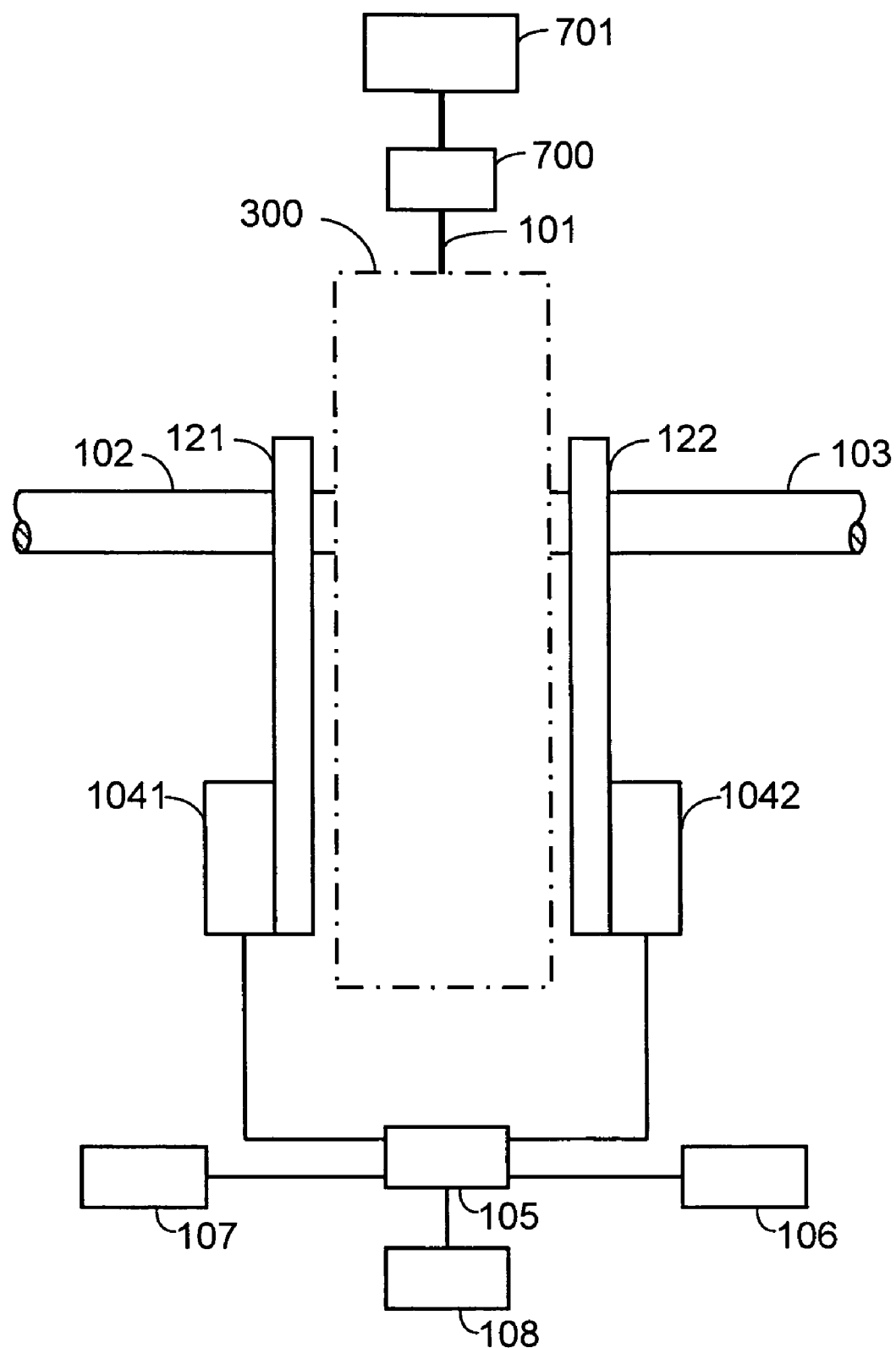
FIG. 7 is a schematic view showing the preferred embodiment that has a multi-shaft transmission disposed between differential output ends and revolving electro-mechanical installations that respectively coupled to the differential output ends taken from FIG. 5.

FIG. 7 is a schematic view showing the preferred embodiment that has a multi-shaft transmission disposed between differential output ends and revolving electro-mechanical installations that respectively coupled to the differential output ends taken from FIG. 5. The preferred embodiment is essentially comprised of:

a three-end shaft differential gear set 300: relates to a planetary or revolving type differential gear set or other three-end shaft differential gear set providing similar functions of the prior art, provided with an input shaft 101 to input revolving kinetics fed from an engine, or a motor, or other revolving power source 701, a first differential output end 102, and a second differential output end 103;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

the first differential output end 102 drives an electro-mechanical rotation part 1031 of the revolving electro-mechanical installation 1041 on another turning shaft through the transmission 121;

the second differential output end 103 drives an electro-mechanical rotation part 1032 of the revolving electro-mechanical installation 1042 on another turning shaft through the transmission 122; the static part of the revolving electro-mechanical installation 1041 is locked to a static casing; and that of the revolving electro-mechanical installation 1042 is also locked to a static casing; and the three-end shaft differential gear set may be replaced by any other three-end shaft differential gear set provided similar functions;

the revolving electro-mechanical installation 1041: comprised of AC or DC, brush or brushless, synchronous or asynchronous revolving electro-mechanical installation provided with a stationary electro-mechanical static part and an electro-mechanical rotation part with its electro-mechanical rotation part to be coupled to the first differential output end 102 disposed not on the same shaft through the first transmission 121 that function as a motor or as a generator; constructed in a cylindrical, disk or any other geometric form; and subject the control by the controller 105;

the revolving electro-mechanical installation 1042: comprised of AC or DC, brush or brushless, synchronous or asynchronous revolving electro-mechanical installation provided with a stationary electro-mechanical static part and an electro-mechanical rotation part with its electro-mechanical rotation part to be coupled to the second differential output end 103 disposed not on the same shaft through the second transmission 122 that functions as a motor or as a generator; constructed in a cylindrical, disk or any other geometric form; and subject the control by the controller 105;

the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installations 1041, 1042, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: relates to an optional item comprised of dynamo-electric device, electronic device, wire or wireless, signal transmission interface, or manual operation interface device, microprocessor and related software to receive setup signals for controlling the controller 105; and the transmissions 121, 122: comprised of gear, chain, belt pulley, or toothed belt pulley, or other revolving transmission depending on the speed ratio and revolving direction required; when the input shafts of both transmissions revolve in the same direction, the output shafts of both transmissions may revolve in the same direction or in the different direction.

The preferred embodiment of the present invention as illustrated in FIG. 7 provides the following functions:

(1) Both revolving electro-mechanical installations 1041, 1042 are directly or by means of connecting to the controller 105 connected in parallel of the same polarity.

(2) When both of the first and the second differential output ends 102, 103 are driving at the same speed, the generation voltage is the same for both of the revolving electro-mechanical installations 1041, 1042 connected at the same polarity to each other in parallel, and both of the revolving electro-mechanical installations 1041, 1042 are in stand-by status since there is no current flowing between them.

(3) When the system is engaging in differential operation and the rotation speed of the first differential output end 102 is greater than that of the second differential output end 103, the generation voltage of the revolving electro-mechanical installation 1041 gets higher than that of the revolving electro-mechanical installation 1042, and the current flows from the revolving electro-mechanical installation 1041 to the revolving electro-mechanical installation 1042; whereas the revolving electro-mechanical installation 1041 is operating as a generator, the current outputted produces the counter torque, and the revolving electro-mechanical installation 1042 operates as a motor to produce torque for both revolving electro-mechanical installations 1041, 1042 to provide auxiliary function for each other in jointly driving the second differential output end 103.

(4) When the system is engaging in differential operation and the rotation speed of the second differential output end 103 is greater than that of the first differential output end 102, the generation voltage of the revolving electro-mechanical installation 1042 gets higher than that of the revolving electro-mechanical installation 1041, and the current flows from the revolving electro-mechanical installation 1042 to the revolving electro-mechanical installation 1041; whereas the revolving electro-mechanical installation 1042 is operating as a generator, the current outputted produces the counter torque, and the revolving electro-mechanical installation 1041 operates as a motor to produce torque for both revolving electro-mechanical installations 1041, 1042 to provide auxiliary function for each other in jointly driving the second differential output end 103.

(5) Once the rechargeable device 106 is adapted to the system, either or both of the revolving electro-mechanical installations 1041, 1042 is driven by the revolving kinetics from the input shaft 101 or by the inertial kinetics from the load to charge the rechargeable device 106.

(6) Power outputted from the rechargeable device 106 drives either or both of the revolving electro-mechanical installations 1041, 1042 to drive and operate as the function of a motor.

(7) When both of the first and the second differential output ends 102, 103 are engaging in differential operation, they are subject to the regulation and control of torque distribution through the controller 105 in both functions described in the preceding subparagraphs (3) and (4).

(8) The system operates under the control by an external system by means of the setup control circuit device 108.

(9) When the clutch 700 is disposed to the system, the clutch 700 is controlled to indicate disengaged status to leave the electric power from the rechargeable device 106 to drive either or both of the electro-mechanical rotation parts 1031, 1032 respectively of the revolving electro-mechanical installations 1041 and 1042 so to respectively drive the first and the second differential output ends 102, 103 to engage in driving operation in the same revolving direction or in different revolving directions.

Figure 8:
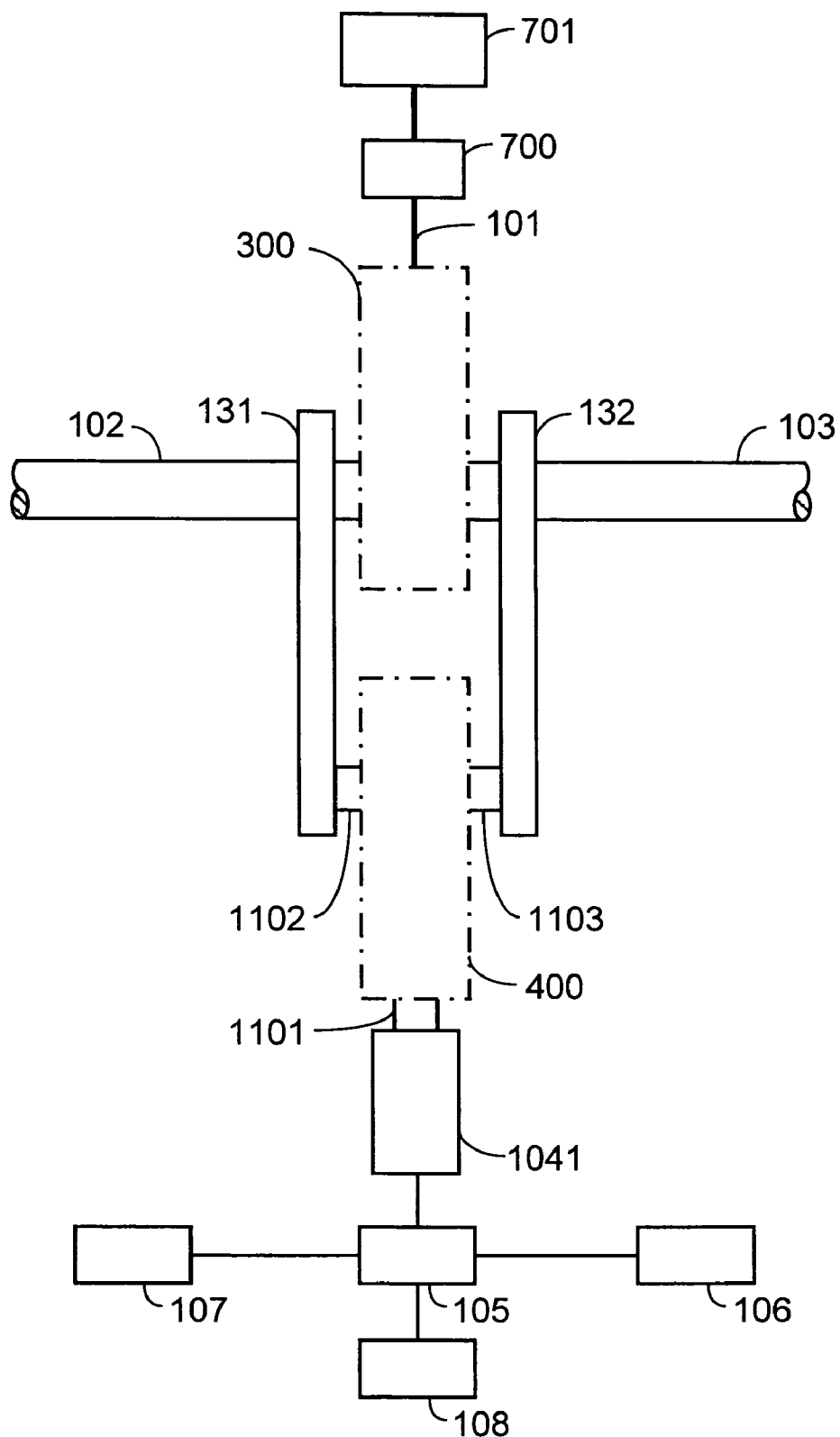
FIG. 8 is a schematic view showing that a preferred embodiment of the present invention adapted with a three-end shaft differential gear set, a three-end shaft secondary differential gear set, and a unit of revolving electro-mechanical installation that provides functions of a generator and a motor.

FIG. 8 is a schematic view showing that a preferred embodiment of the present invention adapted with a three-end shaft differential gear set, a three-end shaft secondary differential gear set, and a unit of revolving electro-mechanical installation that provides functions of a generator and a motor. The preferred embodiment of the present invention is essentially comprised of:

a three-end shaft differential gear set 300: relates to a planetary or revolving type differential gear set or other three-end shaft differential gear set providing similar functions of the prior art, provided with an input shaft 101 to input revolving kinetics fed from an engine, or a motor, or other revolving power source 701, a first differential output end 102, and a second differential output end 103;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

an auxiliary differential gear set 400: relates to a planetary or revolving type differential gear set of the prior art, provided with an input shaft 1101 to input revolving kinetics fed from an engine, or a motor, or other revolving power source, and a first and a second differential output end 1102, 1103 to perform differential;

the first differential output end 102 of the three-end shaft differential gear set 300 drives the first differential output end 1102 of the auxiliary differential gear set 400 through a transmission 131;

the second differential output end 103 of the three-end shaft differential gear set 300 drives the second differential output end 1103 of the auxiliary differential gear set 400 through a transmission 132;

the output end 1101 of the auxiliary differential gear set 400 is coupled to the electro-mechanical rotation part of the revolving electro-mechanical installation 1041; the static part of the revolving electro-mechanical installation 1041 is locked to a static casing; and the three-end shaft differential gear set or the auxiliary differential gear set may be replaced by any other differential gear set providing similar functions;

the revolving electro-mechanical installation 1041: comprised of AC or DC, brush or brushless, synchronous or asynchronous revolving electro-mechanical installation provided with a stationary electro-mechanical static part and an electro-mechanical rotation part with its electro-mechanical rotation part to be coupled to the output end 1101 of the auxiliary differential gear set 400 that functions as a motor or as a generator; constructed in a cylindrical, disk or any other geometric form and subject the control by the controller 105;

the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installation 1041, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: relates to an optional item comprised of dynamo-electric device, electronic device, wire or wireless signal transmission interface, or manual operation interface device, microprocessor and related software to receive setup signals for controlling the controller 105;

the transmissions 131, 132: each comprised of gear, chain, belt pulley, or toothed belt pulley, or other revolving transmission depending on the speed ratio and the revolving direction required with the relation between speed ratio and revolving direction described as follows:

(1) When there is no difference in the rotation speed between both of the first and the second differential output ends 102, 103 of the three-end shaft differential gear set 300, a static status without difference in the rotation speed presents between the static part and the rotation part of the revolving electro-mechanical installation 1041.

(2) When difference in the rotation speed presents between the first and the second differential output ends 102, 103 of the three-end shaft differential gear set 300, differential operation in the rotation speed to produce the function of power generation appears between the static part and the rotation part of the revolving electro-mechanical installation 1041 to function as a generator.

The preferred embodiment of the present invention illustrated in FIG. 8 provides the following functions:

(1) The revolving electro-mechanical installation 1041 is in static status when both of the first and the second differential output ends 102, 103 are driving at the same speed.

(2) When the three-end shaft differential gear set 300 is engaging in differential operation, and the rotation speed of the first differential output end 102 is higher than that of the second differential output end 103, the revolving electro-mechanical installation 1041 is driven to function as a generator to produce damp by tanking advantage of the counter-torque upon outputting the power, so to feed back certain kinetics from the first differential output end 102 to the second differential output end 103.

(3) When the three-end shaft differential gear set 300 is engaging in differential operation, and the rotation speed of the second differential output end 103 is higher than that of the first differential output end 102, the revolving electro-mechanical installation 1041 is driven to function as a generator to produce damp by taking advantage of the counter-torque upon outputting the power, so to push inversely certain kinetics from the second differential output end 103 to the first differential output end 102.

(4) Once the rechargeable device 106 is adapted to the system, the revolving electro-mechanical installation 1041 functions as a generator to charge the rechargeable device 106.

(5) While providing the function as described in the preceding subparagraph 2, the power from the rechargeable device 106 drives the revolving electro-mechanical installation 1041 to function as a motor in a driving direction that allows to increase the torque to drive the second differential output end 103.

(6) While providing the function as described in the preceding subparagraph 3, the power from the rechargeable device 106 drives the revolving electro-mechanical installation 1041 to function as a motor in a driving direction that allows to increase the torque to drive the first differential output end 102.

(7) Power outputted from the rechargeable device 106 drives the revolving electro-mechanical installation 1041 to function as a motor to simultaneously drive both of the first and the second differential output ends 102, 103 in the same direction.

(8) When the clutch 700 is disposed to the system, the clutch 700 is controlled to indicate disengaged status to leave the electric power from the rechargeable device 106 to drive the electro-mechanical rotation parts of the revolving electro-mechanical installations 1041 so to respectively drive the first and the second differential output ends 102, 103 to engage in driving operation in the same revolving direction.

Figure 9:
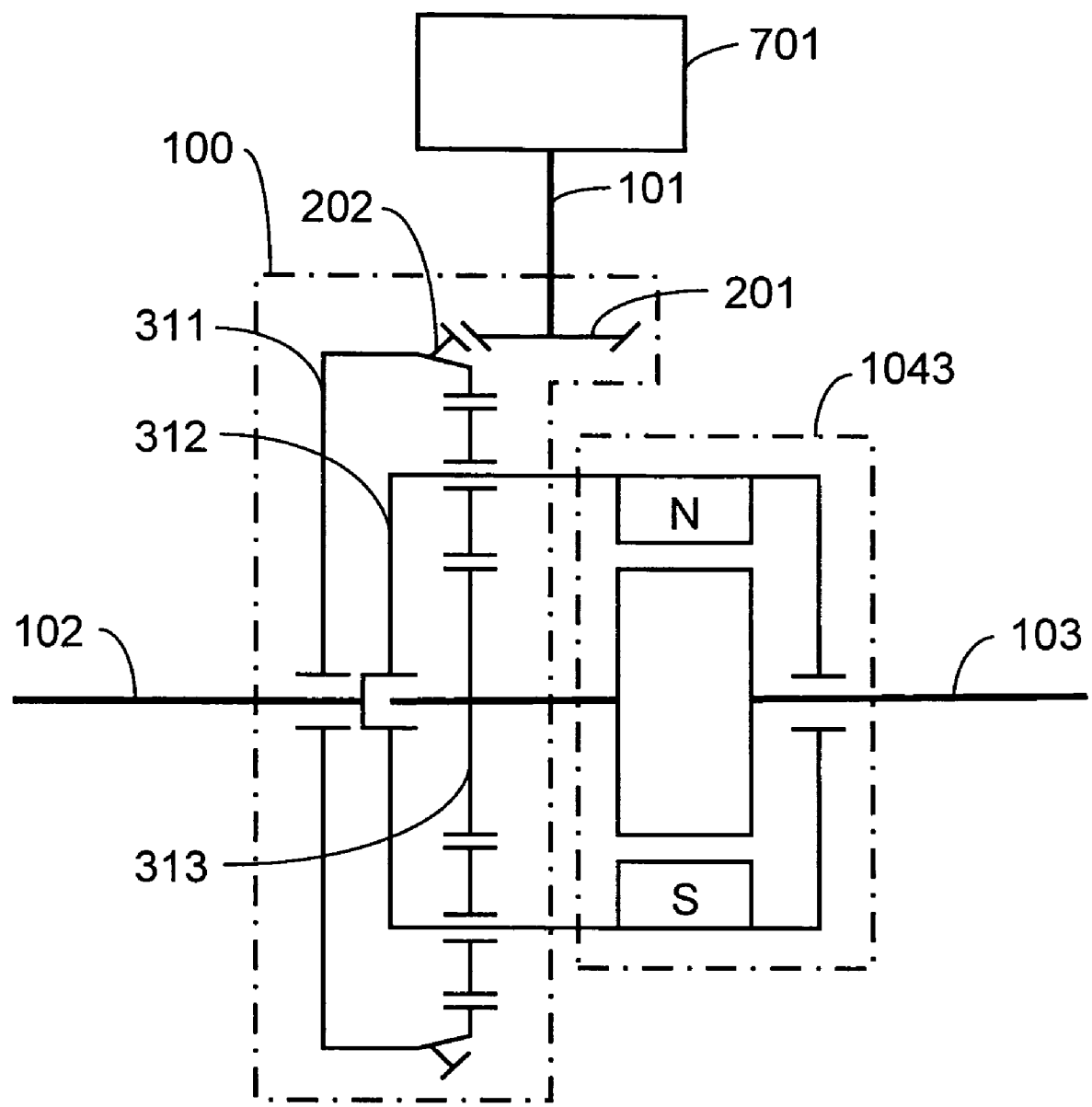
FIG. 9 is a schematic view showing a preferred embodiment of the present invention that has a unit of a dual action type revolving electro-mechanical installation given with function of vortex current generation damp between two differential output ends of a planetary differential gear set.

FIG. 9 is a schematic view showing a preferred embodiment of the present invention that has a unit of a dual action type revolving electro-mechanical installation given with function of vortex current generation damp between two differential output ends of a planetary differential gear set. The preferred embodiment of the present invention is essentially comprised of:

a planetary three-end shaft differential gear set 100: relates to a planetary differential gear set or other three-end shaft differential gear set providing similar functions of the prior art, having its input shaft 101 to input revolving kinetics fed from an engine, or a motor, or other revolving power source 701 to drive the disk type gear 202 through the mushroom pinion 201 thus to further drive an external gear 311; its first differential output end 102 coupled to the differential gear rocker 312 from a planetary gear set with the second differential output end 103 coupled to a sun gear 313;

the first differential output end 102 drives through the differential gear rocker 312 of planetary gear set the second electro-mechanical revolution block 1052 from a dual action type revolving electro-mechanical installation 1043 that provides function of vortex current power generation damp;

one end of the second differential output end 103 is coupled to the first electro-mechanical revolution block 1051 given with function of vortex current power generation damp;

the dual action type revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action type vortex current damp service may be made in a cylindrical, disk or any other geometric form; if the external excitation is provided, a conduction ring, a common excitation power source and controller must be provided.

The preferred embodiment of the present invention illustrated in FIG. 9 provides the following functions:

(1) In the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and (2) Damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so to feed back certain part of the torque from the differential output end operating at a faster speed to the other differential output end operating at a faster speed.

Figure 10:
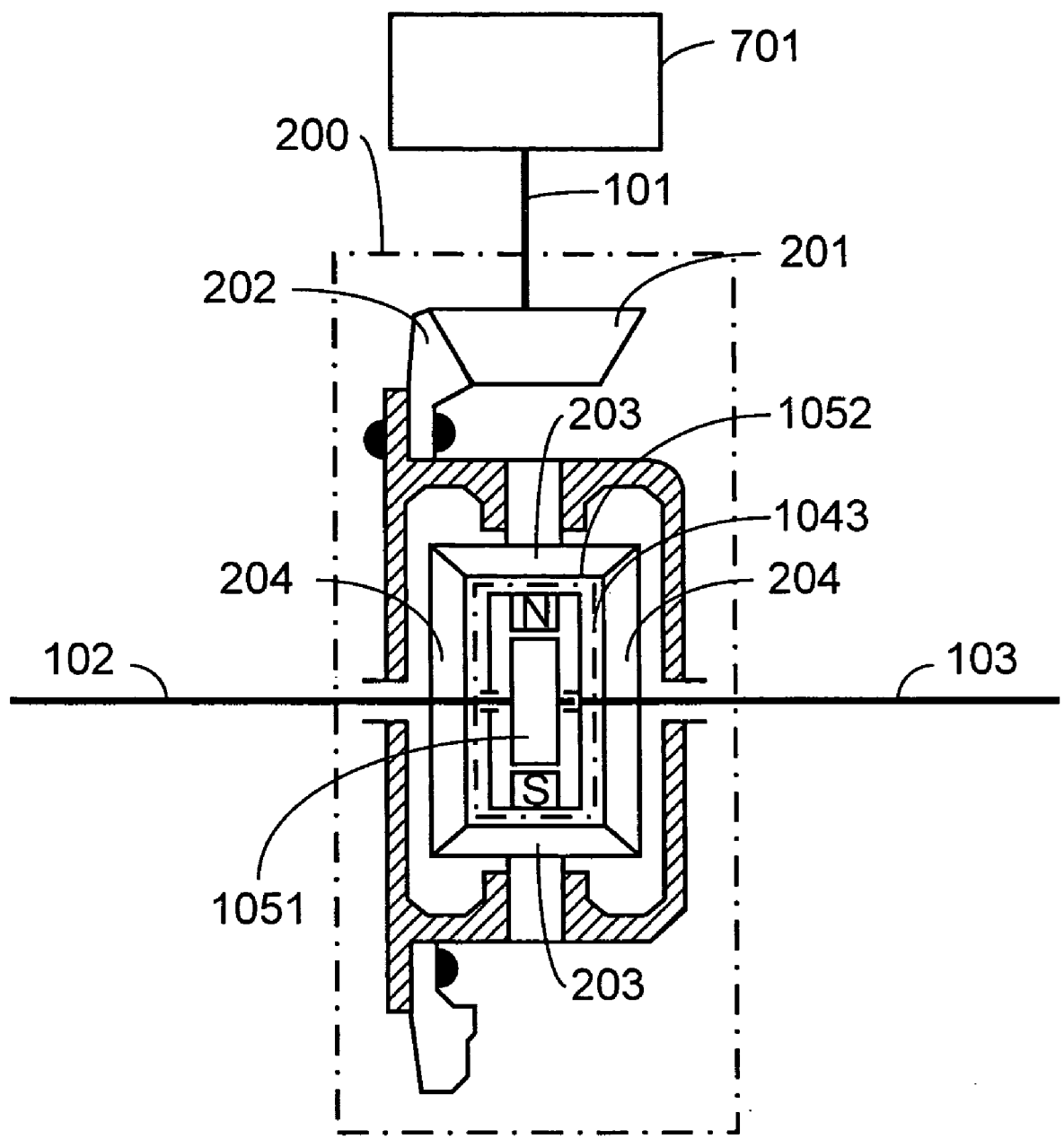
FIG. 10 is a schematic view showing a preferred embodiment of the present invention that has a unit of a dual action type revolving electro-mechanical installation given with function of vortex current generation damp between two differential output ends of a revolving differential gear set.

FIG. 10 is a schematic view showing a preferred embodiment of the present invention that has a unit of a dual action type revolving electro-mechanical installation given with function of vortex current power generation damp between two differential output ends of a revolving differential gear set. The preferred embodiment is essentially comprised of:

Revolving type three-end shaft differential gear set 200: relates to a revolving differential gear set or other three-end shaft differential gear set providing similar functions of the prior art, having its input shaft 101 to receive revolving kinetics from an engine, or a motor, or other revolving power source 701 to drive a disk type gear 202 through a mushroom pinion 201 to further draw both side differential gears 204 through a differential pinion gear 203 for both side differential gears 204 to respectively drive the first and the second differential output ends 102, 103;

the inner side of a first differential output end 102 drives the first electro-mechanical revolution block 1051 of the dual action type revolving electro-mechanical installation 1043 that provides function of vortex current power generation damp;

and the inner side of a second differential output end 103 drives the second electro-mechanical revolution block 1052 of the dual action type revolving electro-mechanical installation 1043 that provides function of vortex current power generation damp;

the dual action type revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action type over current damp device may be made in a cylindrical, disk or any other geometric form; if the external excitation is provided, a conduction ring, a common excitation power source and controller must be provided.

The preferred embodiment of the present invention as illustrated in FIG. 10 provides the following functions:

(1) In the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and (2) Damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so to feed back certain part of the torque from the differential output end operating at a faster speed to the other differential output end operating at a faster speed.

Figure 11:
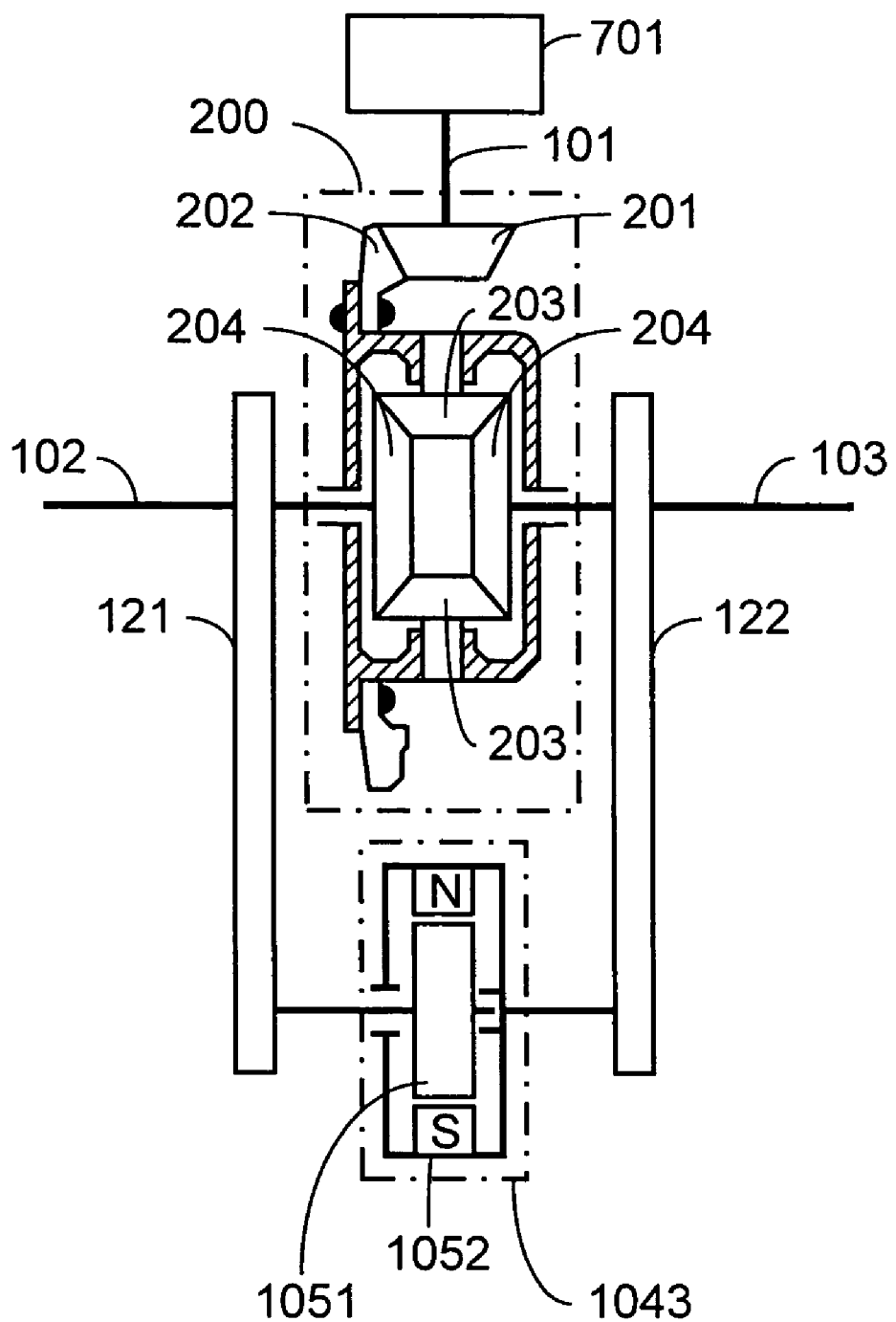
FIG. 11 is a schematic view showing a preferred embodiment of the present invention that has a unit of a dual action type revolving electro-mechanical installation given with function of vortex current generation damp between two differential output ends of a revolving differential gear set.

FIG. 11 is a schematic view showing a preferred embodiment of the present invention that has a unit of a dual action type revolving electro-mechanical installation given with function of vortex current power generation damp between two differential output ends of a revolving differential gear set. The preferred embodiment is essentially comprised of:

the revolving type three-end shaft differential gear set 200: relates to a revolving differential gear set or other three-end shaft differential gear set providing similar functions of the prior art, having its input shaft 101 to receive revolving kinetics from an engine, or a motor, or other revolving power source 701 to drive a disk type gear 202 through a mushroom pinion 201 to further draw both side differential gears 204 through a differential pinion gear 203 for both side differential gears 204 to respectively drive the first and the second differential output ends 102, 103;

the first differential output end 102 drives through the first transmission 121 the first electro-mechanical revolution block 1051 of the dual action type revolving electro-mechanical installation 1043 given with function of vortex current power generation damp; and the second differential output end 103 drives through the second transmission 122 the second electro-mechanical revolution block 1052 of the dual action type revolving electro-mechanical installation 1043 given with function of vortex current power generation damp;

the dual action type revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action type vortex current damp device may be made in a cylindrical, disk or any other geometric form; if the external excitation is provided, a conduction ring, a related excitation power source and controller must be provided;

the transmissions 121, 122: comprised of gear, chain, belt pulley, or toothed belt pulley, or other revolving transmission depending on the speed ratio and the revolving direction required with the relation between speed ratio and revolving direction described as follows:

(1) When both of the first and the second differential output ends 102, 103 revolve at the same speed and in the same direction, a static status without revolution difference is present between the first and the second electro-mechanical revolution blocks 1051, 1052 of the dual action type electro-mechanical installation 1043 given with function of vortex current power generation damp; and (2) When differential speed presents between the first and the second differential output ends 102, 103, both of the first and the second electro-mechanical revolution blocks 1051, 1052 of the dual action type electro-mechanical installation 1043 given with function of vortex current power generation damp indicate differential operation to produce the damp function by vortex current power generation.

The preferred embodiment of the present invention as illustrated in FIG. 11 provides the following functions:

(1) In the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and (2) Damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so to feed back certain part of the torque from the differential output end operating at a faster speed to the other differential output end operating at a faster speed.

Figure 12:
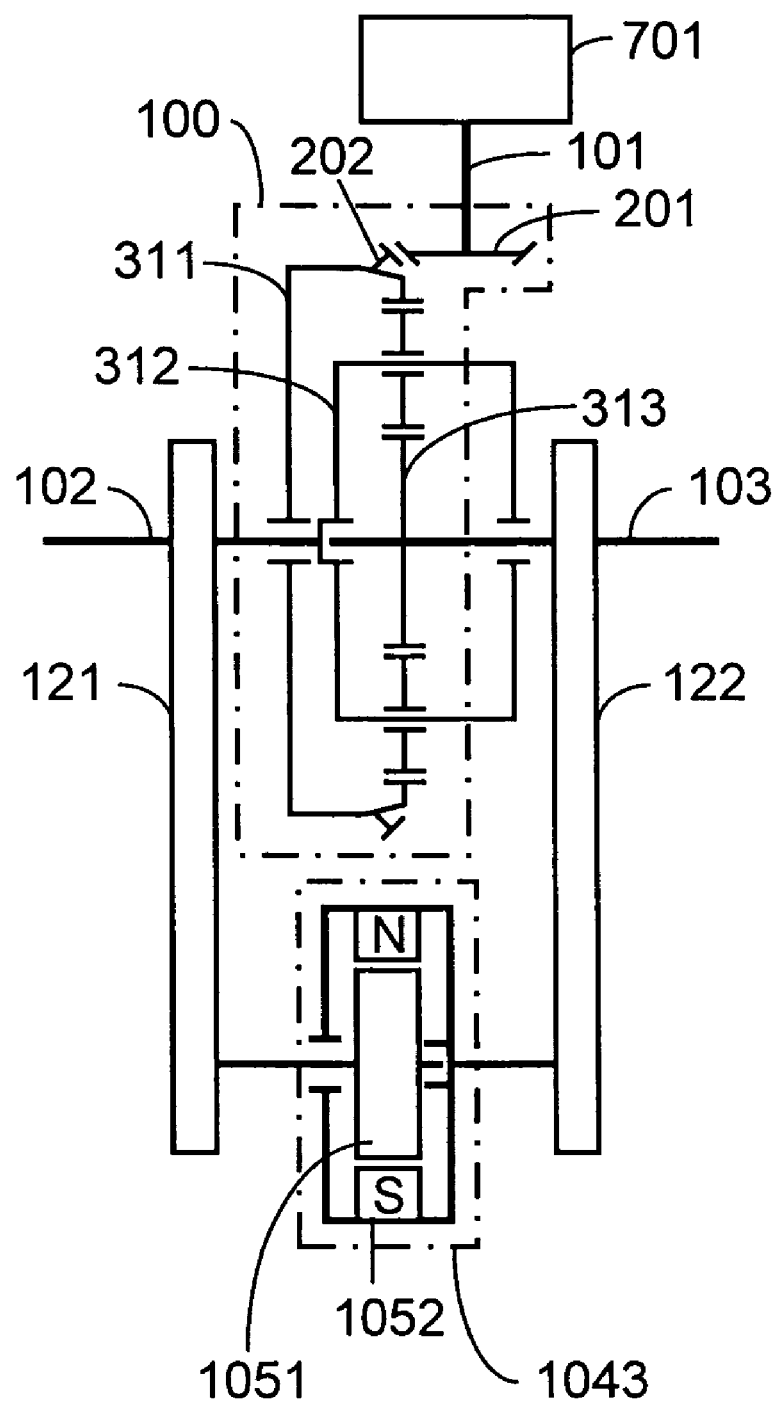
FIG. 12 is a schematic view showing a preferred embodiment of the present invention that has a unit of a dual action type revolving electro-mechanical installation given with function of vortex current generation damp between two differential output ends of a planetary differential gear set.

FIG. 12 is a schematic view showing a preferred embodiment of the present invention that has a unit of a dual action revolving electro-mechanical installation given with function of vortex current power generation damp between two differential output ends of a planetary differential gear set. The preferred embodiment of the present invention is essentially comprised of:

a planetary three-end shaft differential gear set 100: relates to a planetary differential gear set of other three-end shaft differential gear set providing similar functions of the prior art, having its input shaft 101 to input revolving kinetics fed from an engine, or a motor, or other revolving power source 701 to drive the disk type gear 202 through the mushroom pinion 201 thus to further drive an external gear 311; its first differential output end 102 coupled to the differential gear rocker 312 from a planetary gear set with the second differential output end 103 coupled to a sun gear 313;

the first differential output end 102 drives through the transmission 121 the first electro-mechanical revolution block 1051 of the dual action type revolving electro-mechanical installation 1043 given with function of vortex current power generation damp; and the second differential output end 103 drives through the transmission 122 the second electro-mechanical revolution block 1052 of the dual action type revolving electro-mechanical installation 1043 given with function of vortex current power generation damp;

the dual action type revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action type vortex current damp device may be made in a cylindrical, disk or any other geometric form; if the external excitation is provided, a conduction ring, a excitation power source and controller must be provided;

the transmissions 121, 122: comprised of gear, chain, belt pulley, or toothed belt pulley, or other revolving transmission depending on the speed ratio and the revolving direction required with the relation between speed ratio and revolving direction described as follows:

(1) When both of the first and the second differential output ends 102, 103 revolve at the same speed and in the same direction, a static status without revolution difference is present between the first and the second electro-mechanical revolution blocks 1051, 1052 of the dual action type electro-mechanical installation 1043 given with function of vortex current power generation damp; and (2) When the differential speed presents between the first and the second differential output ends 102, 103, both of the first and the second electro-mechanical revolution blocks 1051, 1052 of the dual action type electro-mechanical installation 1043 given with function of vortex current power generation damp indicate differential operation to produce the damp function by vortex current power generation.

The preferred embodiment of the present invention as illustrated in FIG. 12 provides the following functions:

(1) In the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and (2) Damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so to feed back certain part of the torque from the differential output end operating at a faster speed to the other differential output end operating at a faster speed.

Under various application modes of the electric damp controlled three-end shaft differential transmission of the present invention, the installation of the revolving electro-mechanical installation may be taken in consideration depending on the performance requirements, space available and cost as follows:

1. System Application:

(1) To be applied in the regulation and control of both differential output ends of a differential gear set so to exercise differential limit and torque distribution for wheels on both sides of the carrier;

(2) To be applied in the regulation and control of both differential output ends of an intermediate differential gear set so to exercise differential limit and torque distribution for the front and the rear wheels of a carrier driven by the system;

(3) When applied in a wheel type load, both of the front wheel set and the rear wheel set each includes one or a plurality of circular wheels or a revolving wheel in a given geometric form;

(4) The wheel set referred in the preceding subparagraph (3) includes a track construction; and (5) To be applied in other loads of a non-carrier.

2. Functions available from the system include:

(1) Driving the revolving electro-mechanical installation to function as a generator to output power to produce the counter torque, and to control the size of the outputted power thus to change the size of the counter torque through a controller, thus to regulate and control the torque ratio between two differential output ends;

(2) Driving the revolving electro-mechanical installation to function as a generator when the system is adapted with a rechargeable device to control the charging power delivered to the rechargeable device through the controller for the control of the counter torque of the revolving electro-mechanical installation;

(3) Driving the revolving electro-mechanical installation to function as a generator with the power outputted to charge the rechargeable device, or supply power to other power driven load, with the resultant counter torque from the outputted power to prevent losing of torque from a differential output end due to idling by the other differential output end;

(4) Driving through the controller the revolving electro-mechanical installation to function as a motor by using the power outputted form the rechargeable device when adapted to the system, thus to regulate and control the operation status of both differential output ends;

(5) Driving the revolving electro-mechanical installation to function as a generator to output power to drive another revolving electro-mechanical installation disposed on the other differential output end to operate as a motor and to regulate and control the torque between both differential gears depending on the driving direction required;

(6) The revolving electro-mechanical installation referred in the preceding subparagraph (5) functioning as a generator and a motor controls rpm, direction, torque and inputted voltage and amperage of the revolution through the controller;

(7) With the rechargeable device adapted to the system, when the differential output end on one side idles, the power outputted from the rechargeable device drives the revolving electro-mechanical installation to function as a motor to drive the other differential output end that is not idling;

(8) The differential output end at faster rotation speed drives the adapted revolving electro-mechanical installation to function as a generator with the power generated and that from the rechargeable device to jointly through the controller drive another revolving electro-mechanical installation disposed on the other differential output end to function as a motor for exercising the active regulation and control of the operation status of both differential output ends;

(9) When a single revolving electro-mechanical installation is provided, the revolving electro-mechanical installation is driven by the power outputted from the rechargeable device through the controller to function as a motor, and further to drive the load through the transmission or both differential output ends of the three-end shaft differential gear set;

(10) When a single revolving electro-mechanical installation is provided, the revolving electro-mechanical installation is driven by the power outputted from the rechargeable device through the controller to function as a motor, and further to drive the load jointly by both differential output ends and an engine through the transmission or the three-end shaft differential gear set;

(11) Driving the individual revolving electro-mechanical installation to function as a motor through the controller and using the power outputted from the rechargeable device when both differential output ends are either directly or by means of a transmission each adapted with a revolving electro-mechanical installation so to directly or through the transmission drive both differential output ends to further drive the load;

(12) Driving the individual revolving electro-mechanical installation to function as a motor through the controller and using the power outputted from the rechargeable device when both differential output ends are either directly or by means of a transmission each adapted with a revolving electro-mechanical installation so to directly or through the transmission drive both differential output ends to further jointly drive the load with the engine;

(13) Taking advantage of the damp of the vortex current effects provided by the revolving electro-mechanical installation given with vortex current power generation function to prevent one differential output end from losing its torque due to that the other differential output end is idling;

(14) Charging the rechargeable device or supplying power to other power driven load through the controller by having the revolving electro-mechanical installation driven by both differential output ends to function as a generator when the engine is running; and

(15) Charging the rechargeable device or supplying power to other power driven load through the controller by having the revolving electro-mechanical installation to function as a generator to produce damp of the braking when the carrier is applying a brake or is driving down on a slope.

3. Optional items of transmission elements for the differential gear set or the transmission include:
 (1) Gear set;
 (2) Chains gear set: including chains and sprockets;
 (3) Friction gear set;
 (4) Toothed belt: including toothed belt and toothed pulley;
 (5) Belt: including belt and pulley; and
 (6) Steel belt: including steel belt and steel pulley.

4. In addition to the mushroom pinion 201 and the disk type gear 202, other type of transmission may be provided for the transmission between the revolving power source 701 and the planetary three-end shaft differential gear set 100 or the revolving type three-end shaft differential gear set 200.

To sum up, the electric damp controlled three-end shaft differential transmission of the present invention provides the following advantages:

1. When the present invention is applied between wheels on both sides of a carrier or between front wheel and rear wheel of a carrier to engage in differential drive, and either differential output ends idles, thermal loss incurs to the construction of differential limit type of the prior art; on the other hand, the present invention is capable of converting the differential kinetics into generation of electric power to be stored in the rechargeable device so to reduce thermal loss and save energy.

2. When the present invention is applied between wheels on both sides of a carrier or between front wheel and rear wheel of a carrier to engage in differential drive, and either differential output ends idles, the construction of the conventional differential limit provides output at a fixed ratio of torque to both differential output ends; on the other hand, the present invention converts the outputted torque from both differential output ends into the torque that can be regulated and controlled.

3. The present invention allows output of power from the rechargeable device to drive the revolving electro-mechanical installation to function as a motor through the controller, thus to provide the active regulation and control of the torque ratio between two differential output ends.

The present invention by taking advantage of the electro-mechanical effects of the revolving electro-mechanical installation provides the regulation and control for a better torque ration between both differential output ends to further yield the benefits of upgraded performance, energy saving and reduced thermal loss; and particularly, the present invention is further characterized that the three-end differential shaft transmission regulated and controlled by electric damp allows the conversion of the differential effects from the three-end shaft type differential gear set into electric power is innovative, provided with precise function.

The invention claimed is:

1. An electric damp controlled three-end shaft differential transmission having a revolving electro-mechanical installation directly or by means of a transmission coupled between two differential output ends of a three-end shaft differential transmission so as to produce damp either by the electric vortex power generation effects produced or by generator effects produced that supply power generated to charge a rechargeable device, or to regulate and control the torque ratio of both differential output ends by the revolving electro-mechanical installation driven by the power from the rechargeable device to function as a motor when both differential output ends are in differential status; furthermore, two revolving installations being respectively adapted to both differential output ends so that once both differential output ends are engaging in differential operation, wherein the power from the revolving installation running at higher rpm and higher voltage drives the other revolving electro-mechanical installation running at lower rpm and lower voltage to function as a motor for regulating and controlling the torque ratio of those two differential output ends comprising:

a planetary three-end shaft differential gear set 100: relates to a planetary differential gear set or other three-end shaft differential gear set having its input shaft 101 to input revolving kinetics fed from an engine, or a motor, or other revolving power source 701 to drive external gear 311; its first differential output end 102 coupled to the differential gear rocker 312 from a planetary gear set with the second differential output end 103 coupled to a sun gear 313 one end of the second differential output end 103 coupled to a first electro-mechanical revolution block 1051 from the dual action revolving electro-mechanical installation 104; one end of the first differential output end 102 coupled to a second electro-mechanical revolution block 1052 from the dual action revolving electro-mechanical installation 104; and a conduction ring with brush 110 disposed to the second differential output end 103 for the dual action revolving electro-mechanical installation 104 to engage in external transmission of electric power;

a clutch 700: relates to a clutch device driven by manual, mechanical force, EM force, fluid force or eccentric force to be disposed at where between a revolving power source 701 and an input shaft 101; and the clutch 700 is an optional item that may be or may not be provided as applicable;

the dual action revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the second differential output end 103 and the second electro-mechanical revolution block 1052 being coupled to the first differential output end 102; and subject to a controller 105 by having its electric power transmitted by an optional conduction ring with brush 110;

the conduction ring with brush 110: an optional item comprised of a contact conduction structure of a conduction ring and a conduction brush, or a non-contact induction conduction structure provided with a primary and a secondary induction windings to transmit electric power between the dual action revolving electro-mechanical installation 104 and the controller 105;

the controller 105: comprised of dynamo-electric switch device, over current protection, over voltage protection, or solid-state electronic device, or a microprocessor and related software; the controller 105 is essentially provided for controlling the strong current transmitted among the dual action revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 being selected as applicable;

the rechargeable device 106: related to an optional item comprised of a rechargeable battery, capacitor, or super capacitor;

the power driven load 107: an optional load electric appliance that inputs and converts electric power into thermal, mechanical, optical, acoustic, or chemical energy; and a setup control circuit device 108 being an optional item comprised of dynamo-electric device, electronic device, wire or wireless signal transmission interface, or manual operation interface device, microprocessor and related software to receive setup signals for controlling the controller 105.

2. The electric damp controlled three-end shaft differential transmission of claim 1, wherein its operation functions include all or any part of the following functions:

(1) when both of the first and the second differential output ends 102, 103 revolve at the same speed and in the same direction, both of the first and the second electro-mechanical revolution blocks 1051, 1052 of the dual action revolving electro-mechanical installation 104 operate in the same direction and at the same speed; in this case, there is the absence of electro-mechanical effects;

(2) when the system engages in differential operation, and the rotation speed of the first differential output end 102 is greater than that of the second differential output end 103, the dual action revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102;

(3) when the system engages in differential operation, and the rotation speed of the second differential output end 103 is greater than that of the first differential output end 102, the dual action revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103;

(4) when the system engages in differential operation, and the rotation speed of the first differential output end 102 is greater than that of the second differential output end 103, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the second differential output end 103 for reducing the torque difference between the first and the second differential output ends 102, 103;

(5) when the system engages in differential operation, and the rotation speed of the second differential output end 103 is greater than that of the first differential output end 102, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the first differential output end 102 for reducing the torque difference between the first and the second differential output ends 102, 103;

(6) when the clutch 700 is disposed to the system, the clutch 700 is controlled to indicate disengaged status to leave the electric power from the rechargeable device 106 to drive the dual action revolving electro-mechanical installation 104 to drive both of the first and the second differential output ends 102, 103 to revolve in the same direction.

3. The electric damp controlled three-end shaft differential transmission of claim 1, wherein another application construction includes:

a revolving three-end shaft differential gear set 200: relates to a revolving differential gear set or other three-end shaft differential gear set having its input shaft 101 to receive revolving kinetics from an engine, or a motor, or other revolving power source 701 to drive a disk gear 202 through a mushroom pinion 201 to further draw both side differential gears 204 through a differential pinion gear 203 for both side differential gears 204 to respectively drive the first and the second differential output ends 102, 103;

one end of the first differential output end 102 is coupled to the first electro-mechanical revolution block 1051 of the dual action revolving electro-mechanical installation 104;

one end of the second differential output end 103 is coupled to the second electro-mechanical revolution block 1052 of the dual action revolving electro-mechanical installation 104; and the conduction ring with brush 110 is disposed to the first or the second differential output end 102, 103 for the dual action revolving electro-mechanical installation 104 to engage in external transmission of power;

the dual action revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the first differential output end 102 and the second electro-mechanical revolution block 1052 being coupled to the second differential output end 103; and having its electric power transmitted by an optional conduction ring with brush 110 subject to the controller 105;

the conduction ring with brush 110: an optional item comprised of a contact conduction structure of a conduction ring and a conduction brush, or a non-contact induction conduction provided with a primary and a secondary induction windings to transmit electric power between the dual action revolving electro-mechanical installation 104 and the controller 105;

the controller 105: comprised of a dynamo-electric switch device, over current and over voltage protection, or solid-state electronic device, or a microprocessor and related software; the controller 105 is essentially provided for controlling the strong current transmitted among the dual action revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: an optional item related to a rechargeable battery, capacitor, or super capacitor;

the power driven load 107: an optional load electric appliance that inputs and converts electric power into thermal, mechanical, optical, acoustic, or chemical energy; and a setup control circuit device 108: relates to an optional item comprised of dynamo-electric device, electronic device, wire or wireless signal transmission interface, or manual operation interface device, microprocessor and related software to receive setup signals for controlling the controller 105.

4. The electric damp controlled three-end shaft differential transmission of claim 3, wherein its operation functions include all or any part of the following functions:

(1) when both of the first and the second differential output ends 102, 103 revolve at the same speed and in the same direction, both of the first and the second electro-mechanical revolution blocks 1051, 1052 of the dual action revolving electro-mechanical installation 104 operate in the same direction and at the same speed; in this case, there is the absence of electro-mechanical effects;

(2) when the system engages in differential operation, and the rotation speed of the first differential output end 102 is greater than that of the second differential output end 103, the dual action revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102;

(3) when the system engages in differential operation, and the rotation speed of the second differential output end 103 is greater than that of the first differential output end 102, the dual action revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103;

(4) when the system engages in differential operation, and the rotation speed of the first differential output end 102 is greater than that of the second differential output end 103, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the second differential output end 103 for reducing the torque difference between the first and the second differential output ends 102, 103;

(5) when the system engages in differential operation, and the rotation speed of the second differential output end 103 is greater than that of the first differential output end 102, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the first differential output end 102 for reducing the torque difference between the first and the second differential output ends 102, 103;

(6) when the clutch 700 is disposed to the system, the clutch 700 is controlled to indicate disengaged status to leave the electric power from the rechargeable device 106 to drive the dual action revolving electro-mechanical installation 104 to drive both of the first and the second differential output ends 102, 103 to revolve in the same direction.

5. The electric damp controlled three-end shaft differential transmission of claim 1, wherein another application construction yet includes:

the revolving three-end shaft differential gear set 200: relates to a revolving differential gear set or other three-end shaft differential gear set having its input shaft 101 to receive revolving kinetics from an engine, or a motor, or other revolving power source 701 to drive a disk gear 202 through a mushroom pinion 201 to further draw both side differential gears 204 through a differential pinion gear 203 for both side differential gears 204 to respectively drive the first and the second differential output ends 102, 103;

the first differential output end 102 drives the first electro-mechanical revolution block 1051 of the dual action revolving electro-mechanical installation 104 through the transmission 121;

the second differential output end 103 drives the second electro-mechanical revolution block 1052 of the dual action revolving electro-mechanical installation 104 through the transmission 122; and the conduction ring with brush 110 is disposed to the dual action revolving electro-mechanical installation 104 for the dual action revolving electro-mechanical installation 104 to engage in external transmission of power;

the dual action revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the first differential output end 102 through the transmission 121 and the second electro-mechanical revolution block 1052 being coupled to the second differential output end 103 through the transmission 122; and having its electric power transmitted by an optional conduction ring with brush 110 subject to the controller 105;

the conduction ring with brush 110: an optional item provided on one side of the dual action revolving electro-mechanical installation 104 and comprised of a contact conduction structure of a conduction ring and a conduction brush, or a non-contact induction conduction having a primary and a secondary induction windings to transmit electric power between the dual action revolving electro-mechanical installation 104 and the controller 105;

the controller 105: comprised of dynamo-electric switch device, over current protection, over voltage protection, or solid-state electronic device, or a microprocessor and related software; the controller 105 is essentially provided for controlling the strong current transmitted among the dual action revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: related to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: relates to an optional item comprised of dynamo-electric device, electronic device, wire or wireless signal transmission interface, or manual operation interface device, microprocessor and related software to receive setup signals for controlling the controller 105;

the transmissions 121, 122: each comprised of gear, chain, belt pulley, or toothed belt pulley, or other revolving transmission depending on the speed ratio and the revolving direction required with the relation between speed ratio and revolving direction described as follows:

(1) when both of the first and the second differential output ends 102, 103 revolve at the same speed and in the same direction, a static status without revolution difference is present between the first and the second electro-mechanical revolution blocks 1051, 1052 of the dual action revolving electro-mechanical installation 104; and (2) when the rotation speeds between both of the first and the second differential output ends 102, 103 vary, the rotation speeds of the first and the second electro-mechanical revolution blocks 1051, 1052 of the dual action revolving electro-mechanical installation 104 also vary so as to provide functions of a generator.

6. The electric damp controlled three-end shaft differential transmission of claim 5, wherein its operation functions include all or any part of the following functions:

(1) when both of the first and the second differential output ends 102, 103 revolve at the same speed and in the same direction, both of the first and the second electro-mechanical revolution blocks 1051, 1052 of the dual action revolving electro-mechanical installation 104 operate in the same direction and at the same speed; in this case, there is the absence of electro-mechanical effects;

(2) when the system engages in differential operation, and the rotation speed of the first differential output end 102 is greater than that of the second differential output end 103, the dual action revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102;

(3) when the system engages in differential operation, and the rotation speed of the second differential output end 103 is greater than that of the first differential output end 102, the dual action revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103;

(4) when the system engages in differential operation, and the rotation speed of the first differential output end 102 is greater than that of the second differential output end 103, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the second differential output end 103 for reducing the torque difference between the first and the second differential output ends 102, 103;

(5) when the system engages in differential operation, and the rotation speed of the second differential output end 103 is greater than that of the first differential output end 102, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the first differential output end 102 for reducing the torque difference between the first and the second differential output ends 102, 103;

(6) when the clutch 700 is disposed to the system, the clutch 700 is controlled to indicate disengaged status to leave the electric power from the rechargeable device 106 to drive the dual action revolving electro-mechanical installation 104 to drive both of the first and the second differential output ends 102, 103 to revolve in the same direction.

7. The electric damp controlled three-end shaft differential transmission of claim 1, wherein another application construction yet includes:

the dual action revolving electro-mechanical installation 104: comprised of AC or DC, brush or brushless, synchronous or asynchronous revolving electro-mechanical installation that functions as a motor or as a generator; constructed in a cylindrical, disk or any other geometric form, including a first and a second electro-mechanical revolution blocks 1051, 1052 serving as a magnetic field and an armature respectively; the first electro-mechanical revolution block 1051 being coupled to the first differential output end 102 through the transmission 121 and the second electro-mechanical revolution block 1052 being coupled to the second differential output end 103 through the transmission 122; and having its electric power transmitted by an optional conduction ring with brush 110 subject to the controller 105;

the conduction ring with brush 110: an optional item provided on one side of the dual action revolving electro-mechanical installation 104 and comprised of a contact conduction structure of a conduction ring and a conduction brush, or a non-contact induction conduction having a primary and a secondary induction windings to transmit electric power between the dual action revolving electro-mechanical installation 104 and the controller 105;

the controller 105: comprised of dynamo-electric switch device, over current protection, over voltage protection, or solid-state electronic device, or a microprocessor and related software; the controller 105 is essentially provided for controlling the strong current transmitted among the dual action revolving electro-mechanical installation 104, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: relates to an optional item comprised of dynamo-electric device, electronic device, wire or wireless signal transmission interface, or manual operation interface device, microprocessor and related software to receive setup signals for controlling the controller 105;

the transmissions 121, 122: comprised of gear, chain, belt pulley, or toothed belt pulley, or other revolving transmission depending on the speed ratio and the revolving direction required with the relation between speed ratio and revolving direction described as follows:

(1) when both of the first and the second differential output ends 102, 103 revolve at the same speed and in the same direction, a static status without revolution difference is present between the first and the second electro-mechanical revolution blocks 1051, 1052 of the dual action revolving electro-mechanical installation 104; and (2) when the rotation speeds between both of the first and the second differential output ends 102, 103 vary, the rotation speeds of the first and the second electro-mechanical revolution blocks 1051, 1052 of the dual action revolving electro-mechanical installation 104 also vary so as to provide functions of a generator.

8. The electric damp controlled three-end shaft differential transmission of claim 7, wherein its operation functions include all or any part of the following functions:

(1) when both of the first and the second differential output ends 102, 103 revolve at the same speed and in the same direction, both of the first and the second electro-mechanical revolution blocks 1051, 1052 of the dual action electro-mechanical installation 104 operate in the same direction and at the same speed; in this case, there is the absence of electro-mechanical effects;

(2) when the system engages in differential operation, and the rotation speed of the first differential output end 102 is greater than that of the second differential output end 103, the dual action revolving electro-mechanical installation 104 produces its electro-mechanical function to charge the rechargeable device 106 or drive the power driven load 107, thus to create damp of counter-torque at the generator and to feed back certain kinetics from the second differential output end 103 to the first differential output end 102;

(3) when the system engages in differential operation, and the rotation speed of the second differential output end 103 is greater than that of the first differential output end 102, the dual action revolving electro-mechanical installation 104 produces its electro-mechanical function to charge the rechargeable device 106 or drive the power driven load 107, thus to create damp of counter-torque at the generator and to feed back certain kinetics from the first differential output end 102 to the second differential output end 103;

(4) when the system engages in differential operation, and the rotation speed of the first differential output end 102 is greater than that of the second differential output end 103, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the second differential output end 103 for reducing the torque difference between the first and the second differential output ends 102, 103;

(5) when the system engages in differential operation, and the rotation speed of the second differential output end 103 is greater than that of the first differential output end 102, the rechargeable device 106 outputs power to the dual action revolving electro-mechanical installation 104 for the dual action revolving electro-mechanical installation 104 to function as a motor, its output torque direction is such that to create a feedback torque at the dual action revolving electro-mechanical installation 104, and in turn the kinetics from the feedback torque drives the first differential output end 102 for reducing the torque difference between the first and the second differential output ends 102, 103;

(6) when the clutch 700 is disposed to the system, the clutch 700 is controlled to indicate disengaged status to leave the electric power from the rechargeable device 106 to drive the dual action revolving electro-mechanical installation 104 to drive both of the first and the second differential output ends 102, 103 to revolve in the same direction.

9. The electric damp controlled three-end shaft differential transmission of claim 1, wherein another application construction yet includes:

a three-end shaft differential gear set 300: relates to a planetary or revolving differential gear set or other three-end shaft differential gear set provided with an input shaft 101 to input revolving kinetics fed from an engine, or a motor, or other revolving power source 701, a first differential output end 102, and a second differential output end 103;

the first differential output end 102 is coupled to the electro-mechanical rotation part 1031 of a revolving electro-mechanical installation 1041; and the second differential output end 103 is coupled to the electro-mechanical rotation part 1032 of another revolving electro-mechanical installation 1042; the static part of the revolving electro-mechanical installation 1041 is locked to a static casing; and that of the revolving electro-mechanical installation 1042 is also locked to a static casing; and the three-end shaft differential gear set 300 may be replaced by any other three-end shaft differential gear set providing similar functions;

the revolving electro-mechanical installation 1041: comprised of AC or DC, brush or brushless, synchronous or asynchronous revolving electro-mechanical installation provided with a stationary electro-mechanical static part and an electro-mechanical rotation part 1031 with its electro-mechanical rotation part 1031 to be coupled to the first differential output end 102 that functions as a motor or as a generator; constructed in a cylindrical, disk or any other geometric form; and subject the control by the controller 105;

the revolving electro-mechanical installation 1042: comprised of AC or DC, brush or brushless, synchronous or asynchronous revolving electro-mechanical installation provided with a stationary electro-mechanical static part and an electro-mechanical rotation part 1032 with its electro-mechanical rotation part 1032 to be coupled to the second differential output end 103 that functions as a motor or as a generator; constructed in a cylindrical, disk or any other geometric form; and subject the control by the controller 105;

the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installation 1041, 1042, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy; and a setup control circuit device 108: relates to an optional item comprised of dynamo-electric device, electronic device, wire or wireless signal transmission interface, or manual operation interface device, microprocessor and related software to receive setup signals for controlling the controller 105.

10. The electric damp controlled three-end shaft differential transmission of claim 9, wherein its operation functions include all or any part of the following functions:

(1) both revolving electro-mechanical installations 1041, 1042 are directly or by means of connecting to the controller 105 connected in parallel of the same polarity;

(2) when both of the first and the second differential output ends 102, 103 are driving at the same speed, the generation voltage is the same for both of the revolving electro-mechanical installations 1041, 1042 connected at the same polarity to each other in parallel, and both of the revolving electro-mechanical installations 1041, 1042 are in stand-by status since there is no current flowing between them;

(3) when the system is engaging in differential operation and the rotation speed of the first differential output end 102 is greater than that of the second differential output end 103, the generation voltage of the revolving electro-mechanical installation 1041 gets higher than that of the revolving electro-mechanical installation 1042, and the current flows from the revolving electro-mechanical installation 1041 to the revolving electro-mechanical installation 1042; whereas the revolving electro-mechanical installation 1041 is operating as a generator, the current outputted produces the counter torque, and the revolving electro-mechanical installation 1042 operates as a motor to produce torque for both revolving electro-mechanical installations 1041, 1042 to provide auxiliary function for each other in jointly driving the second differential output end 103;

(4) when the system is engaging in differential operation and the rotation speed of the second differential output end 103 is greater than that of the first differential output end 102, the generation voltage of the revolving electro-mechanical installation 1042 gets higher than that of the revolving electro-mechanical installation 1041, and the current flows from the revolving electro-mechanical installation 1042 to the revolving electro-mechanical installation 1041; whereas the revolving electro-mechanical installation 1042 is operating as a generator, the current outputted produces the counter torque, and the revolving electro-mechanical installation 1041 operates as a motor to produce torque for both revolving electro-mechanical installations 1041, 1042 to provide auxiliary function for each other in jointly driving the second differential output end 103;

(5) once the rechargeable device 106 is adapted to the system, either or both of the revolving electro-mechanical installations 1041, 1042 is driven by the revolving kinetics from the input shaft 101 or by the inertial kinetics from the load to charge the rechargeable device 106;
(6) power outputted from the rechargeable device 106 drives either or both of the revolving electro-mechanical installations 1041, 1042 to drive and operate as the function of a motor;
(7) when both of the first and the second differential output ends 102, 103 are engaging in differential operation, they are subject to the regulation and control of torque distribution through the controller 105 in both functions described in the preceding subparagraphs (3) and (4);
(8) the system operates under the control by an external system by means of the setup control circuit device 108;
(9) when the clutch 700 is disposed to the system, the clutch 700 is controlled to indicate disengaged status to leave the electric power from the rechargeable device 106 to drive either or both of the electro-mechanical rotation parts 1031, 1032 respectively of the revolving electro-mechanical installations 1041 and 1042 so as to respectively drive the first and the second differential output ends 102, 103 to engage in driving operation in the same revolving direction or in different revolving directions.

11. The electric damp controlled three-end shaft differential transmission of claim 1, wherein another application construction yet includes:
    a three-end shaft differential gear set 300: relates to a planetary or revolving differential gear set or other three-end shaft differential gear set provided with an input shaft 101 to input revolving kinetics fed from an engine, or a motor, or other revolving power source 701, a first differential output end 102, and a second differential output end 103;
    revolving kinetics from the first differential output ends 102 drive a transmission 111 comprised coaxially of a planetary gear set to drive the electro-mechanical rotation part 1031 of the revolving electro-mechanical installation 1041 through an output end 1020 of the transmission 111;
    revolving kinetics from the second differential output ends 103 drive a transmission 112 comprised coaxially of a planetary gear set to drive the electro-mechanical rotation part 1032 of the revolving electro-mechanical installation 1042 through an output end 1030 of the transmission 112; the static part of the revolving electro-mechanical installation 1041 is locked to a static casing; and that of the revolving electro-mechanical installation 1042 is also locked to a static casing; and the three-end shaft differential gear set 300 may be replaced by any other three-end shaft differential gear set providing similar functions;
    the revolving electro-mechanical installation 1041: comprised of AC or DC, brush or brushless, synchronous or asynchronous revolving electro-mechanical installation provided with a stationary electro-mechanical static part and an electro-mechanical rotation part 1031 with its electro-mechanical rotation part 1031 to be coupled to the output end 1020 of the transmission 111; both of the electro-mechanical rotation part 1031 of the revolving electro-mechanical installation 1041 and the output end 1020 of the transmission 111 coupled to it are each provided with a through hole for the insertion for installation by the first differential output end 102 and its bearing that functions as a motor or as a generator; constructed in a cylindrical, disk or any other geometric form; and subject the control by the controller 105;
    the revolving electro-mechanical installation 1042: comprised of AC or DC, brush or brushless, synchronous or asynchronous revolving electro-mechanical installation provided with a stationary electro-mechanical static part and an electro-mechanical rotation part 1032 with its electro-mechanical rotation part 1032 to be coupled to the second differential output end 103 of the transmission 112; both of the electro-mechanical rotation part 1032 of the revolving electro-mechanical installation 1042 and the output end 1030 of the transmission 112 coupled to it are each provided with a through hole for the insertion for installation by the second differential output end 103 and its bearing that functions as a motor or as a generator; constructed in a cylindrical, disk or any other geometric form; and subject the control by the controller 105;
    the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installations 1041, 1042, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;
    the rechargeable device 106: relates to an optional item comprised of a rechargeable battery, capacitor, or super capacitor;
    the power driven load 107: an optional load electric appliance that inputs and converts electric power into thermal, mechanical, optical, acoustic, or chemical energy;
    a setup control circuit device 108: relates to an optional item comprised of dynamo-electric device, electronic device, wire or wireless, signal transmission interface, or manual operation interface device, microprocessor and related software to receive setup signals for controlling the controller 105; and
    the transmissions 111, 112: each relates to a coaxially transmission, such as a planetary gear set, comprised of gear, chain, belt pulley, or toothed belt pulley, or other revolving transmission depending on the speed ratio required; when the input shafts of both transmissions revolve in the same direction, the output shafts of both transmissions 111, 112 are also revolving in the same direction.

12. The electric damp controlled three-end shaft differential transmission of claim 11, wherein its operation functions include all or any part of the following functions:
    (1) both revolving electro-mechanical installations 1041, 1042 are directly or by means of connecting to the controller 105 connected in parallel of the same polarity;
    (2) when both of the first and the second differential output ends 102, 103 are driving at the same speed, the generation voltage is the same for both of the revolving electro-mechanical installations 1041, 1042 connected at the same polarity to each other in parallel, and both of the revolving electro-mechanical installations 1041, 1042 are in stand-by status since there is no current flowing between them;
(3) when the system is engaging in differential operation and the rotation speed of the first differential output end 102 is greater than that of the second differential output end 103, the generation voltage of the revolving electro-mechanical installation 1041 gets higher than that of the revolving electro-mechanical installation 1042, and the current flows from the revolving electro-mechanical installation 1041 to the revolving electro-mechanical installation 1042; whereas the revolving electro-mechanical installation 1041 is operating as a generator, the current outputted produces the counter torque, and the revolving electro-mechanical installation 1042 operates as a motor to produce torque for both revolving electro-mechanical installations 1041, 1042 to provide auxiliary function for each other in jointly driving the second differential output end 103;
(4) when the system is engaging in differential operation and the rotation speed of the second differential output end 103 is greater than that of the first differential output end 102, the generation voltage of the revolving electro-mechanical installation 1042 gets higher than that of the revolving electro-mechanical installation 1041, and the current flows from the revolving electro-mechanical installation 1042 to the revolving electro-mechanical installation 1041; whereas the revolving electro-mechanical installation 1042 is operating as a generator, the current outputted produces the counter torque, and the revolving electro-mechanical installation 1041 operates as a motor to produce torque for both revolving electro-mechanical installations 1041, 1042 to provide auxiliary function for each other in jointly driving the second differential output end 103;
(5) once the rechargeable device 106 is adapted to the system, either or both of the revolving electro-mechanical installations 1041, 1042 is driven by the revolving kinetics from the input shaft 101 or by the inertial kinetics from the load to charge the rechargeable device 106;
(6) power outputted from the rechargeable device 106 drives either or both of the revolving electro-mechanical installations 1041, 1042 to drive and operate as the function of a motor;
(7) when both of the first and the second differential output ends 102, 103 are engaging in differential operation, they are subject to the regulation and control of torque distribution through the controller 105 in both functions described in the preceding subparagraphs (3) and (4);
(8) the system operates under the control by an external system by means of the setup control circuit device 108;
(9) when the clutch 700 is disposed to the system, the clutch 700 is controlled to indicate disengaged status to leave the electric power from the rechargeable device 106 to drive either or both of the electro-mechanical rotation parts 1031, 1032 respectively of the revolving electro-mechanical installations 1041 and 1042 so as to respectively drive the first and the second differential output ends 102, 103 to engage in driving operation in the same revolving direction or in different revolving directions.

13. The electric damp controlled three-end shaft differential transmission of claim 1, wherein another application construction yet includes:
a three-end shaft differential gear set 300: relates to a planetary or revolving differential gear set or other three-end shaft differential gear set provided with an input shaft 101 to input revolving kinetics fed from an engine, or a motor, or other revolving power source 701, a first differential output end 102, and a second differential output end 103;
the first differential output end 102 drives an electro-mechanical rotation part 1031 of the revolving electro-mechanical installation 1041 on another turning shaft through the transmission 121;
the second differential output end 103 drives an electro-mechanical rotation part 1032 of the revolving electro-mechanical installation 1042 on another turning shaft through the transmission 122; the static part of the revolving electro-mechanical installation 1041 is locked to a static casing; and that of the revolving electro-mechanical installation 1042 is also locked to a static casing; and the three-end shaft differential gear set may be replaced by any other three-end shaft differential gear set providing similar functions;
the revolving electro-mechanical installation 1041: comprised of AC or DC, brush or brushless, synchronous or asynchronous revolving electro-mechanical installation provided with a stationary electro-mechanical static part and an electro-mechanical rotation part with its electro-mechanical rotation part to be coupled to the first differential output end 102 disposed not on the same shaft through the first transmission 121 that functions as a motor or as a generator; constructed in a cylindrical, disk or any other geometric form; and subject the control by the controller 105;
the revolving electro-mechanical installation 1042: comprised of AC or DC, brush or brushless, synchronous or asynchronous revolving electro-mechanical installation provided with a stationary electro-mechanical static part and an electro-mechanical rotation part with its electro-mechanical rotation part to be coupled to the second differential output end 103 disposed not on the same shaft through the second transmission 122 that functions as a motor or as a generator; constructed in a cylindrical, disk or any other geometric form; and subject the control by the controller 105;
the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installations 1041, 1042, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;
the rechargeable device 106: relates to an optional item comprised of a rechargeable battery, capacitor, or super capacitor;
the power driven load 107: an optional load electric appliance that inputs and converts electric power into thermal, mechanical, optical, acoustic, or chemical energy;
a setup control circuit device 108: relates to an optional item comprised of dynamo-electric device, electronic device, wire or wireless signal transmission interface, or manual operation interface device, microprocessor and related software to receive setup signals for controlling the controller 105; and the transmissions 121, 122: comprised of gear, chain, belt pulley, or toothed belt pulley, or other revolving transmission depending on the speed ratio and revolving direction required; when the input shafts of both transmissions revolve in the same direction, the output shafts of both transmissions may revolve in the same direction or in the different direction.

14. The electric damp controlled three-end shaft differential transmission of claim 13, wherein its operation functions include all or any part of the following functions:

(1) both revolving electro-mechanical installations 1041, 1042 are directly or by means of connecting to the controller 105 connected in parallel of the same polarity;

(2) when both of the first and the second differential output ends 102, 103 are driving at the same speed, the generation voltage is the same for both of the revolving electro-mechanical installations 1041, 1042 connected at the same polarity to each other in parallel, and both of the revolving electro-mechanical installations 1041, 1042 are in stand-by status since there is no current flowing between them;

(3) when the system is engaging in differential operation and the rotation speed of the first differential output end 102 is greater than that of the second differential output end 103, the generation voltage of the revolving electro-mechanical installation 1041 gets higher than that of the revolving electro-mechanical installation 1042, and the current flows from the revolving electro-mechanical installation 1041 to the revolving electro-mechanical installation 1042; whereas the revolving electro-mechanical installation 1041 is operating as a generator, the current outputted produces the counter torque, and the revolving electro-mechanical installation 1042 operates as a motor to produce torque for both revolving electro-mechanical installations 1041, 1042 to provide auxiliary function for each other in jointly driving the second differential output end 103;

(4) when the system is engaging in differential operation and the rotation speed of the second differential output end 103 is greater than that of the first differential output end 102, the generation voltage of the revolving electro-mechanical installation 1042 gets higher than that of the revolving electro-mechanical installation 1041, and the current flows from the revolving electro-mechanical installation 1042 to the revolving electro-mechanical installation 1041; whereas the revolving electro-mechanical installation 1042 is operating as a generator, the current outputted produces the counter torque, and the revolving electro-mechanical installation 1041 operates as a motor to produce torque for both revolving electro-mechanical installations 1041, 1042 to provide auxiliary function for each other in jointly driving the second differential output end 103;

(5) once the rechargeable device 106 is adapted to the system, either or both of the revolving electro-mechanical installations 1041, 1042 is driven by the revolving kinetics from the input shaft 101 or by the inertial kinetics from the load to charge the rechargeable device 106;

(6) power outputted from the rechargeable device 106 drives either or both of the revolving electro-mechanical installations 1041, 1042 to drive and operate as the function of a motor;

(7) when both of the first and the second differential output ends 102, 103 are engaging in differential operation, they are subject to the regulation and control of torque distribution through the controller 105 in both functions described in the preceding subparagraphs (3) and (4);

(8) the system operates under the control by an external system by means of the setup control circuit device 108;

(9) when the clutch 700 is disposed to the system, the clutch 700 is controlled to indicate disengaged status to leave the electric power from the rechargeable device 106 to drive either or both of the electro-mechanical rotation parts 1031, 1032 respectively of the revolving electro-mechanical installations 1041 and 1042 so as to respectively drive the first and the second differential output ends 102, 103 to engage in driving operation in the same revolving direction or in different revolving directions.

15. The electric damp controlled three-end shaft differential transmission of claim 1, wherein another application construction yet includes:

a three-end shaft differential gear set 300: relates to a planetary or revolving differential gear set or other three-end shaft differential gear set provided with an input shaft 101 to input revolving kinetics fed from an engine, or a motor, or other revolving power source 701, a first differential output end 102, and a second differential output end 103;

an auxiliary differential gear set 400: relates to a planetary or revolving differential gear set provided with an input shaft 1101 to input revolving kinetics fed from an engine, or a motor, or other revolving power source, and a first differential output end 1102, 1103 to perform differential output;

the first differential output end 102 of the three-end shaft differential gear set 300 drives the first differential output end 1102 of the auxiliary differential gear set 400 through a transmission 131;

the second differential output end 103 of the three-end shaft differential gear set 300 drives the second differential output end 1103 of the auxiliary differential gear set 400 through a transmission 132;

the output end 1101 of the auxiliary differential gear set 400 is coupled to the electro-mechanical rotation part of the revolving electro-mechanical installation 1041; the static part of the revolving electro-mechanical installation 1041 is locked to a static casing; and the three-end shaft differential gear set or the auxiliary differential gear set may be replaced by any other differential gear set providing similar functions;

the revolving electro-mechanical installation 1041: comprised of AC or DC, brush or brushless, synchronous or asynchronous revolving electro-mechanical installation provided with a stationary electro-mechanical static part and an electro-mechanical rotation part with its electro-mechanical rotation part to be coupled to the output end 1101 of the auxiliary differential gear set 400 that functions as a motor or as a generator; constructed in a cylindrical, disk or any other geometric form and subject the control by the controller 105;

the controller 105: comprised of dynamo-electric switch device, over current protection, over voltage protection, or solid-state electronic device, or a microprocessor and related software; the controller 105 is essentially provided for controlling the strong current transmitted among the revolving electro-mechanical installation 1041, a rechargeable device 106, and a power driven load 107; in addition to receiving operation signals from a setup control circuit device 108, the controller 105 may be adapted with rectification circuit device to output DC power through the rectification circuit device if the revolving electro-mechanical unit is related to an AC motor provided with the function of AC generation, or is comprised of an electro-mechanical yielding different power generation polarities when engaging in clockwise or counter-clockwise drive operation; the internal components and related circuit of the controller 105 may be selected as applicable;

the rechargeable device 106: relates to an optional item comprised of a rechargeable battery, capacitor, or super capacitor;

the power driven load 107: an optional load electric appliance that inputs and converts electric power into thermal, mechanical, optical, acoustic, or chemical energy;

a setup control circuit device 108: relates to an optional item comprised of dynamo-electric device, electronic device, wire or wireless signal transmission interface, or manual operation interface device, microprocessor and related software to receive setup signals for controlling the controller 105;

the transmissions 131, 132: each comprised of gear, chain, belt pulley, or toothed belt pulley, or other revolving transmission depending on the speed ratio and the revolving direction required with the relation between speed ratio and revolving direction described as follows:

(1) when there is no difference in the rotation speed between both of the first and the second differential output ends 102, 103 of the three-end shaft differential gear set 300, a static status without difference in the rotation speed presents between the static part and the rotation part of the revolving electro-mechanical installation 1041;

(2) when difference in the rotation speed presents between the first and the second differential output ends 102, 103 of the three-end shaft differential gear set 300, differential operation in the rotation speed to produce the function of power generation appears between the static part and the rotation part of the revolving electro-mechanical installation 1041.

16. The electric damp controlled three-end shaft differential transmission of claim 15, wherein its operation functions include all or any part of the following functions:

(1) the revolving electro-mechanical installation 1041 is in static status when both of the first and the second differential output ends 102, 103 are driving at the same speed;

(2) when the three-end shaft differential gear set 300 is engaging in differential operation, and the rotation speed of the first differential output end 102 is higher than that of the second differential output end 103, the revolving electro-mechanical installation 1041 is driven to function as a generator to produce damp by tanking advantage of the counter-torque upon outputting the power, so as to feed back certain kinetics from the first differential output end 102 to the second differential output end 103;

(3) when the three-end shaft differential gear set 300 is engaging in differential operation, and the rotation speed of the second differential output end 103 is higher than that of the first differential output end 102, the revolving electro-mechanical installation 1041 is driven to function as a generator to produce damp by taking advantage of the counter-torque upon outputting the power, so as to push inversely certain kinetics from the second differential output end 103 to the first differential output end 102;

(4) once the rechargeable device 106 is adapted to the system, the revolving electro-mechanical installation 1041 functions as a generator to charge the rechargeable device 106;

(5) while providing the function as described in the preceding subparagraph 2, the power from the rechargeable device 106 drives the revolving electro-mechanical installation 1041 to function as a motor in a driving direction that allows to increase the torque to drive the second differential output end 103;

(6) while providing the function as described in the preceding subparagraph 3, the power from the rechargeable device 106 drives the revolving electro-mechanical installation 1041 to function as a motor in a driving direction that allows to increase the torque to drive the first differential output end 102;

(7) power outputted from the rechargeable device 106 drives the revolving electro-mechanical installation 1041 to function as a motor to simultaneously drive both of the first and the second differential output ends 102, 103 in the same direction;

(8) when the clutch 700 is disposed to the system, the clutch 700 is controlled to indicate disengaged status to leave the electric power from the rechargeable device 106 to drive the electro-mechanical rotation parts of the revolving electro-mechanical installations 1041 so as to respectively drive the first and the second differential output ends 102, 103 to engage in driving operation in the same revolving direction.

17. The electric damp controlled three-end shaft differential transmission of claim 1, wherein another application construction yet includes:

the first differential output end 102 drives through the differential gear rocker 312 of planetary gear set the second electro-mechanical revolution block 1052 from a dual action revolving electro-mechanical installation 1043 that provides function of vortex current power generation damp;

one end of the second differential output end 103 is coupled to the first electro-mechanical revolution block 1051 given with function of vortex current power generation damp;

the dual action revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action vortex current damp device may be made in a cylindrical, disk or any other geometric form; if the external excitation is provided, a conduction ring, a common excitation power source and controller must be provided.

18. The electric damp controlled three-end shaft differential transmission of claim 17, wherein its operation functions include all or any part of the following functions:

(1) in the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and
(2) damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so as to feed back certain part of the torque from the differential output end operating at a faster speed to the other differential output end operating at a faster speed.

19. The electric damp controlled three-end shaft differential transmission of claim 1, wherein another application construction yet includes:
revolving three-end shaft differential gear set 200: relates to a revolving differential gear set or other three-end shaft differential gear set having its input shaft 101 to receive revolving kinetics from an engine, or a motor, or other revolving power source 701 to drive a disk gear 202 through a mushroom pinion 201 to further draw both side differential gears 204 through a differential pinion gear 203 for both side differential gears 204 to respectively drive the first and the second differential output ends 102, 103;
the inner side of a first differential output end 102 drives the first electro-mechanical revolution block 1051 of the dual action revolving electro-mechanical installation 1043 that provides function of vortex current power generation damp;
and the inner side of a second differential output end 103 drives the second electro-mechanical revolution block 1052 of the dual action revolving electro-mechanical installation 1043 that provides function of vortex current power generation damp;
the dual action revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action vortex current damp device may be made in a cylindrical, disk or any other geometric form; if the external excitation is provided, a conduction ring, a common excitation power source and controller must be provided.

20. The electric damp controlled three-end shaft differential transmission of claim 19, wherein its operation functions include all or any part of the following functions:
(1) in the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and
(2) damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so as to feed back certain part of the torque from the differential output end operating at a faster speed to the other differential output end operating at a faster speed.

21. The electric damp controlled three-end shaft differential transmission of claim 1, wherein another application construction yet includes:
the revolving three-end shaft differential gear set 200: relates to a revolving differential gear set or other three-end shaft differential gear set having its input shaft 101 to receive revolving kinetics from an engine, or a motor, or other revolving power source 701 to drive a disk gear 202 through a mushroom pinion 201 to further draw both side differential gears 204 through a differential pinion gear 203 for both side differential gears 204 to respectively drive the first and the second differential output ends 102, 103;
the first differential output end 102 drives through the first transmission 121 the first electro-mechanical revolution block 1051 of the dual action revolving electro-mechanical installation 1043 given with function of vortex current power generation damp; and
the second differential output end 103 drives through the second transmission 122 the second electro-mechanical revolution block 1052 of the dual action revolving electro-mechanical installation 1043 given with function of vortex current power generation damp;
the dual action revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action vortex current damp device may be made in a cylindrical, disk or any other geometric form; if the external excitation is provided, a conduction ring, a related excitation power source and controller must be provided;
the transmissions 121, 122: comprised of gear, chain, belt pulley, or toothed belt pulley, or other revolving transmission depending on the speed ratio and the revolving direction required with the relation between speed ratio and revolving direction described as follows:
(1) when both of the first and the second differential output ends 102, 103 revolve at the same speed and in the same direction, a static status without revolution difference is present between the first and the second electro-mechanical revolution blocks 1051, 1052 of the dual action electro-mechanical installation 1043 given with function of vortex current power generation damp; and
(2) when differential speed presents between the first and the second differential output ends 102, 103, both of the first and the second electro-mechanical revolution blocks 1051, 1052 of the dual action electro-mechanical installation 1043 given with function of vortex current power generation damp indicate differential operation to produce the damp function by vortex current power generation.

22. The electric damp controlled three-end shaft differential transmission of claim 21, wherein its operation functions include all or any part of the following functions:

(1) in the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and (2) damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so as to feed back certain part of the torque from the differential output end operating at a faster speed to the other differential output end operating at a faster speed.

23. The electric damp controlled three-end shaft differential transmission of claim 1, wherein another application construction yet includes:

the first differential output end 102 drives through the transmission 121 the first electro-mechanical revolution block 1051 of the dual action revolving electro-mechanical installation 1043 given with function of vortex current power generation damp; and the second differential output end 103 drives through the transmission 122 the second electro-mechanical revolution block 1052 of the dual action revolving electro-mechanical installation 1043 given with function of vortex current power generation damp;

the dual action revolving electro-mechanical installation 1043 given with function of vortex current power generation damp: comprised of a rotary magnetic field of an excitation winding excited by externally applied current or of magnetic poles of a permanent magnet, and a structure of a rotation part of a rotary good conductor or of a conductor provided with a cage; accordingly, when a relative motion is created between the magnetic field and the rotation part, a induction current created from the conductor of the rotor forms a counter torque; the dual action vortex current damp device may be made in a cylindrical, disk or any other geometric form; if the external excitation is provided, a conduction ring, a excitation power source and controller must be provided;

the transmissions 121, 122: comprised of gear, chain, belt pulley, or toothed belt pulley, or other revolving transmission depending on the speed ratio and the revolving direction required with the relation between speed ratio and revolving direction described as follows:

(1) when both of the first and the second differential output ends 102, 103 revolve at the same speed and in the same direction, a static status without revolution difference is present between the first and the second electro-mechanical revolution blocks 1051, 1052 of the dual action electro-mechanical installation 1043 given with function of vortex current power generation damp; and (2) when the differential speed presents between the first and the second differential output ends 102, 103, both of the first and the second electro-mechanical revolution blocks 1051, 1052 of the dual action electro-mechanical installation 1043 given with function of vortex current power generation damp indicate differential operation to produce the damp function by vortex current power generation.

24. The electric damp controlled three-end shaft differential transmission of claim 23, wherein its operation functions include all or any part of the following functions:

(1) in the status that both of the first and the second differential output ends 102, 103 are operating at the same speed and in the same direction, both of the first and the second electro-mechanical revolution blocks 1051, 1052 of the revolving electro-mechanical installation 1043 are also operating at the same speed and in the same direction; the revolving electro-mechanical installation 1043 is prevented from providing its function of power generation by vortex current; and (2) damp function to vortex current power generation is produced when both of the first and the second differential output ends 102, 103 are engaging in differential operation and both of the first and the second electro-mechanical revolution blocks 1051, 1052 of the revolving electro-mechanical installation 1043 are also engaging in the relatively differential operation so as to feed back certain part of the torque from the differential output end operating at a faster speed to the other differential output end operating at a faster speed.

25. The electric damp controlled three-end shaft differential transmission of claim 1, wherein it is applied in the regulation and control of both differential output ends of a differential gear set so as to exercise differential limit and torque distribution for wheels on both sides of the carrier.

26. The electric damp controlled three-end shaft differential transmission of claim 1, wherein it is applied in the regulation and control of both differential output ends of an intermediate differential gear set so as to exercise differential limit and torque distribution for the front and the rear wheels of a carrier driven by the system.

27. The electric damp controlled three-end shaft differential transmission of claim 1, wherein when applied in a wheel load, both of the front wheel set and the rear wheel set each includes one or a plurality of circular wheels or a revolving wheel in a given geometric form.

28. The electric damp controlled three-end shaft differential transmission of claim 27, wherein the wheel set includes a track construction.

29. The electric damp controlled three-end shaft differential transmission of claim 1 provides all or any part of the following functions:

(1) driving the revolving electro-mechanical installation to function as a generator to output power to produce the counter torque, and to control the size of the outputted power thus to change the size of the counter torque through a controller, thus to regulate and control the torque ratio between two differential output ends;

(2) driving the revolving electro-mechanical installation to function as a generator when the system is adapted with a rechargeable device to control the charging power delivered to the rechargeable device through the controller for the control of the counter torque of the revolving electro-mechanical installation;

(3) driving the revolving electro-mechanical installation to function as a generator with the power outputted to charge the rechargeable device, or supply power to other power driven load, with the resultant counter torque from the outputted power to prevent losing of torque from a differential output end due to idling by the other differential output end;

(4) driving through the controller the revolving electro-mechanical installation to function as a motor by using the power outputted form the rechargeable device when adapted to the system, thus to regulate and control the operation status of both differential output ends;
(5) driving the revolving electro-mechanical installation to function as a generator to output power to drive another revolving electro-mechanical installation disposed on the other differential output end to operate as a motor and to regulate and control the torque between both differential gears depending on the driving direction required;
(6) the revolving electro-mechanical installation referred in the preceding subparagraph (5) functioning as a generator and a motor controls rpm, direction, torque and inputted voltage and amperage of the revolution through the controller;
(7) with the rechargeable device adapted to the system, when the differential output end on one side idles, the power outputted from the rechargeable device drives the revolving electro-mechanical installation to function as a motor to drive the other differential output end that is not idling;
(8) the differential output end at faster rotation speed drives the adapted revolving electro-mechanical installation to function as a generator with the power generated and that from the rechargeable device to jointly through the controller drive another revolving electro-mechanical installation disposed on the other differential output end to function as a motor for exercising the active regulation and control of the operation status of both differential output ends;
(9) when a single revolving electro-mechanical installation is provided, the revolving electro-mechanical installation is driven by the power outputted from the rechargeable device through the controller to function as a motor, and further to drive the load through the transmission or both differential output ends of the three-end shaft differential gear set;
(10) when a single revolving electro-mechanical installation is provided, the revolving electro-mechanical installation is driven by the power outputted from the rechargeable device through the controller to function as a motor, and further to drive the load jointly by both differential output ends and an engine through the transmission or the three-end shaft differential gear set;
(11) driving the individual revolving electro-mechanical installation to function as a motor through the controller and using the power outputted from the rechargeable device when both differential output ends are either directly or by means of a transmission each adapted with a revolving electro-mechanical installation so as to directly or through the transmission drive both differential output ends to further drive the load;
(12) driving the individual revolving electro-mechanical installation to function as a motor through the controller and using the power outputted from the rechargeable device when both differential output ends are either directly or by means of a transmission each adapted with a revolving electro-mechanical installation so as to directly or through the transmission drive both differential output ends to further jointly drive the load with an engine;
(13) taking advantage of the damp of the vortex current effects provided by the revolving electro-mechanical installation given with vortex current power generation function to prevent one differential output end from losing its torque due to that the other differential output end is idling;
(14) charging the rechargeable device or supplying power to other power driven load through the controller by having the revolving electro-mechanical installation driven by both differential output ends to function as a generator when the engine is running; and
(15) charging the rechargeable device or supplying power to other power driven load through the controller by having the revolving electro-mechanical installation to function as a generator to produce damp of the braking when the carrier is applying a brake or is driving down on a slope.

30. The electric damp controlled three-end shaft differential transmission of claim 1, wherein optional items of transmission elements for the differential gear set or the transmission include at least one of the following items:
(1) a gear set;
(2) a chain gear set: including chains and sprockets;
(3) a friction gear set;
(4) a toothed belt: including toothed belt and toothed pulley;
(5) a belt: including belt and pulley; or
(6) a steel belt: including steel belt and steel pulley.

31. The electric damp controlled three-end shaft differential transmission of claim 1, wherein in addition to a mushroom pinion 201 and a disk gear 202, other of transmission may be provided for the transmission between a revolving power source 701 and the planetary three-end shaft differential gear set 100 or a revolving three-end shaft differential gear set 200.

* * * * *

UNITED STATES PATENT AND TRADEMARK OFFICE
CERTIFICATE OF CORRECTION

| | | |
|---|---|---|
| PATENT NO. | : 7,618,340 B2 | Page 1 of 1 |
| APPLICATION NO. | : 11/512388 | |
| DATED | : November 17, 2009 | |
| INVENTOR(S) | : Tai-Her Yang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 386 days.

Signed and Sealed this

Fourteenth Day of December, 2010

David J. Kappos
*Director of the United States Patent and Trademark Office*